(12) United States Patent
Richter et al.

(10) Patent No.: US 10,550,833 B2
(45) Date of Patent: Feb. 4, 2020

(54) MICRODOSING SYSTEM

(71) Applicant: Fraunhofer-Gesellschaft zur Foerderung der angewandten Forschung e.V., Munich (DE)

(72) Inventors: Martin Richter, Munich (DE); Martin Wackerle, Assling (DE); Sebastian Kibler, Munich (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 15/372,280

(22) Filed: Dec. 7, 2016

(65) Prior Publication Data
US 2017/0159650 A1 Jun. 8, 2017

(30) Foreign Application Priority Data
Dec. 8, 2015 (DE) .......................... 10 2015 224 619

(51) Int. Cl.
*F04B 43/04* (2006.01)
*F04B 51/00* (2006.01)
(Continued)

(52) U.S. Cl.
CPC ............ *F04B 43/046* (2013.01); *F04B 51/00* (2013.01); *F04B 53/10* (2013.01);
(Continued)

(58) Field of Classification Search
CPC ........ F04B 43/046; F04B 51/00; F04B 52/10; F16K 99/0001; F16K 2099/0094; G01F 25/0092; G01F 11/28; G01M 3/26
(Continued)

(56) References Cited

U.S. PATENT DOCUMENTS 3,425,262 A * 2/1969 Herzog ............... G01F 25/0007
73/1.19
6,422,057 B1 * 7/2002 Anderson ......... A61M 5/14228
73/1.36
(Continued)

FOREIGN PATENT DOCUMENTS

CN 101657701 2/2010
CN 102143775 8/2011
(Continued)

OTHER PUBLICATIONS

Richter et al., "A novel flow sensor with high time resolution based on differential pressure principle", Proceedings MEMS 99, Orlando/USA; Jan. 17-21, 1999, pp. 118-123.

*Primary Examiner* — Robert R Raevis
(74) *Attorney, Agent, or Firm* — Michael A. Glenn; Perkins Coie LLP

(57) ABSTRACT

The invention relates to a method as well as a microdosing system for dosing an amount of fluid to be dispensed, wherein the microdosing system includes a micropump including an inlet and an outlet and configured to suck the fluid to be dispensed through the inlet and to dispense at least part of the fluid from the outlet. Further, the inventive microdosing system includes a first flow sensor arranged on the inlet side or the outlet side having an opening and a flow rate meter, wherein the flow rate meter is configured to determine the flow rate of the fluid passing through this opening. Additionally, the inventive microdosing system includes calibrators and/or fault detectors of the first flow sensor.

29 Claims, 7 Drawing Sheets

(51) Int. Cl.
  *F04B 53/10* (2006.01)
  *F16K 99/00* (2006.01)
  *G01F 25/00* (2006.01)
  *G01M 3/26* (2006.01)
  *G01F 11/28* (2006.01)

(52) U.S. Cl.
  CPC ...... *F16K 99/0001* (2013.01); *G01F 25/0092* (2013.01); *G01M 3/26* (2013.01); *F16K 2099/0094* (2013.01); *G01F 11/28* (2013.01)

(58) Field of Classification Search
  USPC ............ 73/1.16–1.36, 168; 415/118; 417/63
  See application file for complete search history.

(56) References Cited

U.S. PATENT DOCUMENTS

| | | | |
|---|---|---|---|
| 6,991,214 | B2 | 1/2006 | Richter et al. |
| 7,104,768 | B2 | 9/2006 | Richter et al. |
| 7,631,852 | B2 | 12/2009 | Kruckow et al. |
| 8,382,452 | B2 | 2/2013 | Richter et al. |
| 2005/0123420 | A1 | 6/2005 | Richter et al. |
| 2010/0132813 | A1 | 6/2010 | Mendelson et al. |
| 2010/0290935 | A1 | 11/2010 | Richter et al. |
| 2011/0142688 | A1 | 6/2011 | Chappel et al. |
| 2011/0196305 | A1 | 8/2011 | Katoh |
| 2012/0116348 | A1 | 5/2012 | Kawamura et al. |
| 2014/0119954 | A1* | 5/2014 | Schweitzer ........... A61M 5/142 417/63 |
| 2015/0059749 | A1 | 3/2015 | Nitta |
| 2016/0158437 | A1* | 6/2016 | Biasi ................. A61M 5/14228 604/500 |

FOREIGN PATENT DOCUMENTS

| | | |
|---|---|---|
| DE | 10238600 A1 | 3/2004 |
| DE | 69827952 T2 | 3/2005 |
| DE | 102008035990 A1 | 2/2010 |
| EP | 1320686 B1 | 2/2004 |
| EP | 1007973 B1 | 12/2004 |
| EP | 1576294 B1 | 8/2006 |
| EP | 2220371 B1 | 6/2012 |
| JP | 2008139096 A | 6/2008 |
| JP | 2010057898 A | 3/2010 |
| JP | 4531563 B2 | 6/2010 |
| JP | 2011160868 A | 8/2011 |
| JP | 2011177411 A | 9/2011 |
| JP | 5027930 B2 | 6/2012 |
| JP | 5636555 B2 | 12/2014 |
| JP | 6081962 B2 | 1/2017 |
| WO | 9848330 A1 | 10/1998 |
| WO | 03095837 A1 | 11/2003 |

* cited by examiner

MICRODOSING SYSTEM

CROSS-REFERENCE TO RELATED APPLICATIONS

This application claims priority from German Patent Application No. 10 2015 224 619.1, which was filed on Dec. 8, 2015, and which is incorporated herein in its entirety by this reference thereto.

The invention relates to a microdosing system for dosing an amount of fluid to be dispensed having the features of claim 1 as well as a method for dosing the amount of fluid to be dispensed having the features of claim 16.

BACKGROUND OF THE INVENTION

There is a need for exact, cost-effective microdosing systems in different fields, e.g. when dosing medicine or when dosing scents. Components of these microdosing systems are, normally, a fluid actuator, for example, a pump, e.g. a micromembrane pump and an element for monitoring the fluid flow, for example, a flow sensor.

Known microdosing systems, however, are usually large and expensive.

Micromembrane pumps having passive check valves are known, for example, from WO 03/095837 A1. The micromembrane pump disclosed therein is combined with a nozzle chip for generating a free jet disposed on the outlet side.

From WO 98/48330, for example, a flow sensor in the form of a microdosing chip is known that is based on the technology of a piezoresistive pressure sensor. The microdosing chip comprises a membrane. The membrane comprises an opening that serves as an orifice plate of a flow to be measured.

Piezoresistive pressure sensors are, on the one hand, cost-effective to produce, but, on the other hand, very sensitive against stress as induced in particular by the assembly, for example, by adhesing, clamping or the same. The microdosing chip known from the above stated WO 98/48330 shows the same behavior during assembly.

Due to such stress induced during assembly, known pressure and flow sensors, respectively, show undesired drift behavior when the same are assembled in a conventional manner. High-quality pressure and flow sensors, respectively, have to be assembled expensively in a stress-free manner for preventing the sensor drift, which, however, increases the costs.

Known options for reducing the sensor drift, are, for example, the adaptation of a glass wafer to the silicon wafer of the microdosing chip. Alternatively, the microdosing chip can be assembled in a very stress-free assembly method.

Such stress-free mounting methods, however, are very expensive, which again prevents the usage of such microdosing chips in applications necessitating low production costs.

If, however, microdosing pumps and microdosing chips are combined with one another in a cost-effective production method, the sensor value of the microdosing chip will drift due to the above stated reasons, i.e., due to the stress induced during assembly, which prevents exact dosing of the microdosing system.

Thus, there is a trade-off between a cost-effective production of a microdosing system where the pressure and flow sensor, respectively, still operate exactly, i.e., without any considerable drift.

SUMMARY

According to an embodiment, a microdosing system for dosing an amount of fluid to be dispensed may have: a micropump including an inlet and an outlet and configured to suck the fluid to be dispensed through the inlet and to dispense at least part of the fluid from the outlet, a first flow sensor arranged on the inlet side or the outlet side including an opening and a flow rate measuring means, wherein the flow rate measuring means is configured to determine the flow rate of the fluid passing through this opening, and means for calibrating and/or detecting faults of the microdosing system.

According to another embodiment, a method for dosing an amount of fluid to be dispensed by means of a microdosing system may have the steps of: providing a micropump including an inlet and an outlet, sucking the fluid to be dispensed through the inlet of the micropump, providing a first flow sensor arranged on the inlet side or outlet side including an opening and a flow rate measuring means, dispensing at least part of the sucked fluid from the outlet of the micropump, and determining the flow rate of the fluid that has passed through the opening of the flow sensor, and calibrating and/or detecting faults of the microdosing system, in order to counteract a sensor drift of the first flow sensor and to calibrate the microdising system.

An inventive microdosing system for dosing an amount of fluid to be dispensed comprises, among others, a micropump comprising an inlet and an outlet and configured to suck the fluid to be dispensed through the inlet and to dispense at least part of the fluid from the outlet. Further, the microdosing system comprises a first flow sensor arranged on the inlet or outlet side comprising an opening and a flow rate measuring means, wherein the flow rate measuring means is configured to determine the flow rate of the fluid passing through this opening. By means of the flow rate measuring means, the flow sensor can measure and monitor, respectively, the amount of fluid dispensed by the micropump. Here, the fluid to be dispensed flows through the opening provided in the flow sensor. Based on a pressure difference occurring in the process, for example, the flow sensor can determine, by means of the flow rate measuring means, the flow rate of the fluid to be dispensed flowing through the opening of the flow sensor. Further, the inventive microdosing system comprises means for calibrating and/or detecting faults of the microdosing system. The means for calibrating and/or detecting faults of the microdosing system is configured to calibrate the microdosing system in that the sensor signal of the first flow sensor is set to a defined initial value, e.g., to the value zero at any time $t_0$. The flow sensor can be calibrated and "set to zero", respectively, at any time. If the flow sensor shows a sensor drift, this drifting, i.e. time-variable sensor signal can be reset and calibrated and "set to zero", respectively, at the time $t_0$. Thus, by means of the means for calibrating and/or detecting faults, the microdosing system can be recalibrated at any time. In that way, a flow sensor produced with simple and cost-effective assembly methods, such as adhesing with epoxy, can be used, since the assembly-induced sensor drift at the time $t_0$ is compensated according to the invention.

According to an embodiment, the means for calibrating and/or detecting faults of the microdosing system can comprise a control means that is configured to detect an actual sensor signal of the first flow sensor when the micropump is inactive and to correct subsequent sensor signals of the first flow sensor based thereon.

It is possible that the control means is configured to determine a correction value and to subtract the same from the amount of the detected actual sensor signal of the first flow sensor, wherein the obtained difference value forms a corrected starting point for the subsequent sensor signals of the first flow sensor. When the control means determines that no flow is flowing (e.g., when the micropump is inactive), the flow sensor is calibrated and "set to zero", respectively, by means of the means for calibrating and/or detecting faults. The control means can detect, for example, the present actual value of the flow sensor and correct the same by means of a correction value for specifying the resulting signal as current "zero flow value" and zero point or starting point, respectively. The correction value is determined by the control means and is based on the detected actual sensor signal. The correction value is subtracted from the detected actual sensor signal. The difference value obtained in that way serves as the new starting point for subsequent sensor signals. In other words, the present actual sensor signal is specified as new "zero signal". This new "zero signal" can be subtracted from the measurement signal as offset in an immediately subsequent measurement of the flow sensor where the flow sensor has not yet drifted again. For example, the correction value can correspond to the amount of the measured actual sensor signal and can be subtracted from the same. When, for example, when the pump is inactive, an actual sensor signal of ±50 mV is measured due to sensor drift, a correction value in the amount of 50 mV can be subtracted from the amount of the actual sensor signal. This means the amount of the actual value of the sensor signal of ±50 mV is corrected by the correction value also in the amount of 50 mV. In that way, the drifting sensor signal is reset to the value zero. In other words, if the sensor signal of the flow sensor is subject to a time variable sensor drift, the amount of the sensor drift can be set to zero by means of the means for calibrating and/or detecting faults at any time $t_0$. So to speak, the sensor drift is hidden and corrected, respectively, at the time $t_0$ and the current zero point of the flow sensor is respecified at the time $t_0$. However, as described above, the amount of the correction value does not have to correspond exactly to the amount of the actual sensor signal. It is also possible that the amount of the correction value has any value between zero and the actual value of the sensor signal. When, for example, an actual sensor signal of ±50 mV is measured due to sensor drift, a correction value having any value between 0 mV and 50 mV can be subtracted from the amount of the actual sensor signal. In that case, it would be possible, for example, that a correction value of 49 mV is subtracted from the amount of the measured actual sensor signal of ±50 mV. Accordingly, a new difference value of 1 mV would result which is used as the new starting point and as "zero point", respectively, for subsequent measurements. In the above stated cases, a low cost sensor, not assembled with expensive assembly methods and possibly even housed under mechanical stress can also be used as an exact flow sensor suitable for the inventive microdosing system.

It is also possible that the correction value is within a range of the amount of the actual sensor signal plus a tolerance value of ±10% of the actual sensor signal or plus a tolerance value of ±20% of the actual sensor signal. Accordingly, at an actual sensor signal value of ±50 mV, a correction value $x_1$ in the range of 50 mV±10%, i.e., 45 mV<$x_1$<55 mV or a correction value $x_2$ in the range of 50 mV±20%, i.e., 40 mV<$x_2$<60 mV could be selected.

According to a further embodiment, the control means can be configured to perform detection of the actual sensor signal of the first flow signal and correction of subsequent sensor signals prior to any or prior to each pump stroke. Both a suction stroke and a pressure stroke of the micropump count as a pump stroke. The new initial value and "zero value", respectively, of the flow sensor can be respecified prior to each suction and/or pressure stroke of the pump, i.e., the microdosing system can be recalibrated prior to each suction and/or pressure stroke of the pump.

It is possible that the microdosing system has, on the inlet side, the same pressure as on the outlet side or a lower pressure than on the outlet side. For example, the microdosing system can comprise an inlet reservoir and an outlet reservoir, wherein inlet and outlet reservoir are at the same pressure level. Due to the fact that the same pressure prevails both on the inlet side and on the outlet side, no free flow of the fluid to be dispensed takes place in the forward direction, i.e., from inlet to outlet. If a higher pressure is applied on the outlet side than on the inlet side, check valves provided in the pump can prevent free flow in the backward direction, i.e., from outlet to inlet also referred to as leakage flow. When it is ensured that no free flow exists in the forward and/or backward direction, the control means can measure the present actual value of the flow sensor and respecify the current zero value by considering the sensor drift.

It is possible that the microdosing system comprises a valve arranged on the inlet side and/or on the outlet side, wherein the valve is an active normally closed valve and/or an active normally open valve and/or a valve with operation threshold pressure which is closed below a threshold pressure and/or a double normally closed micro valve and/or a safety valve. Such valves can be used, for example, when the pressure on the inlet side is higher than the pressure on the outlet side. In this case, free flow would occur in forward direction. For preventing the same, the aforementioned valves are used, according to this embodiment. Such a valve is arranged on the inlet side. The same closes the inlet such that no free flow can take place. Free flow can also be prevented by a valve arranged on the outlet side. As an active normally closed valve and/or an active normally open valve, for example, a valve known from EP 1321686 B1 can be used. As a valve having an operation threshold pressure, for example, a valve known from DE 102008035990 A1 can be used. As a double, normally closed micro valve, for example, a valve known from EP 1576294 B1 can be used. As a safety valve, for example, a valve known from EP 2220371 B1 can be used.

According to an embodiment, the microdosing system can comprise a second flow sensor comprising an opening and a flow rate measuring means, wherein the flow rate measuring means is configured to determine the flow rate of the fluid passing through this opening, wherein the second flow sensor is arranged on the inlet side and the first flow sensor is arranged on the outlet side. In that way, the amount of the fluid to be dispensed flowing into the pump via the pump inlet as well as the amount of the fluid dispensed via the outlet of the pump can be determined. These two values can be compared to one another with the help of the means for calibrating and/or detecting faults, in particular by the control means, in order to compare, for example, the amount flowing into the pump to the amount of fluid actually dispensed by the pump. When the two values do not correspond, the microdosing system can conclude that an error has occurred, such as leakage of valves or a gas bubble in the pump chamber.

It is possible that the means for calibrating and/or detecting faults of the microdosing system comprises control means that is configured to control the micropump as well as the first flow sensor arranged on the outlet side and the second flow sensor arranged on the inlet side, such that both the first and the second flow sensor determine the flow rate of the fluid flowing through the respective opening of the first and second flow sensor when the micropump sucks the fluid to be dispensed, and wherein the control means is further configured to compare the flow rate determined by the first flow sensor and the flow rate determined by the second flow sensor. Here, the two flow sensors can monitor each other. In that way, for example, both flow sensors are recalibrated and "set to zero", respectively, by means of the means for calibrating and/or detecting faults prior to each suction stroke of the pump. During a suction stroke, the pump chamber is filled with the fluid to be dispensed through the inlet valve. The sucked flow rate of the fluid is measured with the second flow sensor arranged on the inlet side. At the same time, the first flow sensor arranged on the outlet side measures whether a fluid can be determined through its opening. This would indicate that fluid leaks from the outlet which should actually be closed in a fluid-tight manner during the suction stroke of the pump. In that way a possible leakage including its leakage rate can be detected. In that way, for example, a valve closing the outlet can be leaking which can be detected according to this embodiment. By comparing the measured amount of fluid sucked on the inlet side to an amount of fluid possibly leaked from a leakage on the outlet side in the same time period, the actual suction amount of the pump can be determined exactly.

According to a further embodiment, the means for calibrating and/or detecting faults of the microdosing system can comprise a control means that is configured to control the micropump as well as the first flow sensor arranged on the outlet side and the second flow sensor arranged on the inlet side, such that both the first and the second flow sensors determine the flow rate of the fluid flowing through the respective opening of the first and second flow sensors when the micropump dispenses the fluid to be dispensed from the outlet, and wherein the control means is further configured to compare the flow rate determined by the first flow sensor and the flow rate determined by the second flow sensor. Here, the two flow sensors can monitor each other. In that way, for example, both flow sensors are recalibrated and "set to zero", respectively, by means of the means for calibrating and/or detecting faults prior to each pressure stroke of the pump. The amount of fluid output through the outlet is measured by the first flow sensor arranged on the outlet side. At the same time, the second flow sensor arranged on the inlet side measures whether fluid flow through its opening can be determined. This would indicate that fluid leaks from the inlet which should, however, actually be closed in a fluid-tight manner during the pressure stroke of the pump. In that way, a possible leakage including its leakage rate can be detected. That way, for example, an inlet valve closing the inlet can be leaking which can be detected according to this embodiment. By comparing the measured amount of fluid dispensed at the outlet side and an amount of fluid possibly leaked from a leakage on the inlet side in the same time period, the actual amount of discharge and delivery of the pump can be determined exactly.

By integrating the flow sensor signal of the flow sensor arranged on the inlet side, the stroke volume of the pump during the suction stroke can be determined. By integrating the flow sensor signal of the flow sensor arranged on the outlet side, the stroke volume of the pump during the pressure stroke can be determined. The control device can compare both determined stroke volumes to one another. Possible volume stroke differences indicate, for example, a measurement error.

It is possible that the micropump comprises a pump chamber arranged between the inlet and the outlet, a membrane arranged at least in sections in the region of the pump chamber and a membrane deflection means, wherein the membrane deflection means is configured to deflect the membrane such that the volume of the pump chamber is increased for sucking the fluid to be dispensed and the volume of the pump chamber is reduced for dispensing the fluid to be dispensed. The micropump can be formed as self-priming membrane pump.

The membrane deflection means can be a piezoelement that is configured to deflect the membrane in dependence on the voltage applied to the piezoelement. Thus, low voltages can be sufficient to operate the pump. Additionally, with the piezoelement, high clock rates of the micropump of, for example, 500 Hz, can be realized.

In a further embodiment, the microdosing system can comprise a control means that is configured to compare the flow rate determined through the opening of the first flow sensor with a predetermined flow rate comparison value for controlling the micropump for so long until the flow rate determined through the opening of the first flow sensor is equal to or greater than the predetermined flow rate comparison value. In that way, the micropump can advantageously dispense a desired and predefined, respectively, amount of fluid. If an amount of discharge is necessitated that is greater than the amount to be dispensed with a single pump stroke, the control means can control the micropump until the desired amount is reached.

It is possible that fluid connection means having a low fluidic capacitance are arranged between the micropump and the first and/or second sensor, in particular fluid connection means whose volume remains constant with varying operating pressure of the micropump and/or fluid connection means having a low fluidic inductance. Advantageously, only low or even no "fluidic capacitances" exist between micropump and voltage sensor, such as soft long plastic tubes or other elastic elements that would cause time delays until the flow comes to rest, since long soft tubes widen and in that way enlarge their volume. This means that advantageously no long soft conduits exist between micropump and dosing chip. The fluid inductance describes essentially the inertia of the liquid column that has to be accelerated during a pump stroke. The more inert the liquid column, the slower the same follows the movements of the pump. At high pump frequencies, a liquid column can no longer follow the movements of the pump starting from a certain cutoff frequency. This behavior essentially corresponds to a low pass behavior. Thus, it is advantageous to provide fluid connection means having a length that is as short as possible and a cross-section that is as large as possible.

It is possible that the valve provided on the inlet side is arranged between the micropump and a flow sensor arranged on the inlet side or in flow direction prior to a flow sensor arranged on the inlet side, and that the valve provided on the outlet side is arranged between the micropump and the first flow sensor arranged on the outlet side or in flow direction after the first flow sensor arranged on the outlet side. These are particularly advantageous positions for arranging the blocking valves for preventing free flow.

It is possible that the first flow sensor is arranged in contact with the outlet of the micropump on the outlet side and at least in sections. In that way, there is a direct connection between the pump outlet and the flow sensor, at least in sections. In that way, the paths that the fluid to be dispensed has to cover between pump outlet and flow sensor can advantageously be kept short. Thus, the pump pressure can be transferred in an almost loss-less manner to the flow sensor.

According to an embodiment, the micropump can comprise a valve on the outlet side that is configured to close the outlet when the micropump sucks the fluid to be dispensed and that is configured to open the outlet when the micropump dispenses the fluid to be dispensed from the outlet. Such a valve prevents undesired backflow of the fluid to be dispensed and leakage flow in rearward direction. In that way, this valve allows the fluid to be dispensed to pass through the outlet valve in the pressure stroke of the pump. In the suction stroke of the pump, however, closing of the outlet is desired in order to be able to pump new fluid to be dispensed through the inlet into the pump chamber. Thus, this valve closes the outlet and prevents undesired backflow of the fluid to be dispensed through the outlet in the suction stroke of the micropump.

It is possible that the micropump comprises a valve on the inlet side that is configured to open the inlet when the micropump sucks the fluid to be dispensed and that is configured to close the inlet when the micropump dispenses the fluid to be dispensed from the outlet. This valve prevents undesired backflow of the fluid to be dispensed in the pressure stroke of the pump and a leakage flow in rearward direction, respectively, if, for example, the pressure on the outlet side is greater than the pressure on the inlet side. In that way, this valve allows the fluid to be dispensed to enter through the inlet valve in the suction stroke of the pump. However, in the pressure stoke of the pump, closing of the inlet is desired in order to be able to build up pressure in the pump chamber. Thus, this valve closes the inlet in the pressure stroke of the micropump and hence prevents undesired backflow of the fluid to be dispensed through the inlet. If, for example, when the pump is inactive, the pressure on the outlet side is higher than the pressure on the inlet side, this valve can prevent an undesired leakage flow in rearward direction, i.e., towards the inlet.

It is possible that the second flow sensor is arranged in contact with the inlet of the micropump, at least in sections. In that way, there is a direct connection between the pump inlet and the second flow sensor, at least in sections. Thus, the paths that the fluid to be dispensed has to cover between the second flow sensor and the pump inlet can advantageously be kept short.

According to an embodiment, the means for calibrating and/or detecting faults of the microdosing system can comprise a control means that is configured to control the micropump and the first flow sensor such that the first flow sensor determines the flow rate of the fluid flowing through the opening of the first flow sensor when the micropump is not operated. In that way, when the pump is inactive, i.e., prior to a suction stroke and prior to a pressure stroke, possible leakage of a valve of the micropump arranged on the inlet side and/or on the outlet side can be determined. During a standstill of the micropump, i.e., when the micropump is not operated, the valve arranged on the inlet side and/or on the outlet side are closed and a specific amount of fluid is within the pump chamber. Since the pump is not operated, no overpressure is applied to the pump chamber. If the first flow sensor arranged on the outlet side measures a flow despite closed outlet valve and non-applied overpressure, the microdosing system can conclude that the outlet valve of the micropump is not tight and leaks, respectively. If the first flow sensor arranged on the inlet side measures a flow despite closed inlet valve, the microdosing system can conclude that the inlet valve is not tight and leaks, respectively. Additionally, the control means can detect a leakage flow occurring at the opening of the first flow sensor. For this, when the pump is inactive, the control means measures the flow rate of the leakage flow at the opening of the first flow sensor. This flow rate of the leakage flow is stored as difference value. When the pump is subsequently active, e.g., during a pressure stroke of the pump, this difference value (i.e., the previously determined leakage flow) is subtracted from the flow rate actually measured during the pressure stroke of the pump. In that way, the actual flow rate, i.e., without leakage flow, is measured. Alternatively, it is also possible that the difference value is already subtracted prior to an operating stroke of the pump from the previous zero point level of the flow sensor. In that way, a new zero point reduced and corrected, respectively, by the previously determined amount of the leakage flow is determined. Thus, when the first flow sensor is leaking, the flow sensor can be recalibrated and set to zero, respectively, prior to each operating stroke of the pump.

It is also possible that the means for calibrating and/or detecting faults of the microdosing system comprise a control means that is configured to control the micropump and the first and/or second flow sensor such that the first and/or second flow sensor determines the flow rate of the fluid flowing through the opening of the first and/or second flow sensor when the micropump is not operated. In that way, prior to a suction stroke and prior to a pressure stroke, possible leakage of both valves arranged on the inlet and outlet side, respectively, can be determined simultaneously. During a standstill of the micropump, i.e., when the micropump is not operated, the valve arranged on the inlet side and on the outlet side are closed and a specific amount of fluid is within the pump chamber. Since the pump is not operated, no overpressure is applied to the pump chamber. If the first flow sensor arranged on the outlet side measures a flow despite closed outlet valve and non-applied overpressure, the microdosing system can conclude that the outlet valve is not tight and leaks, respectively. If the second flow sensor arranged on the inlet side measures a flow rate despite closed inlet valve, the microdosing system can conclude that the inlet valve is not tight and leaks, respectively.

According to an embodiment, the micropump can be configured as an intermittently operating pump. Here, the pump generates a pressure pulse and a sequence of pressure pulses, respectively. In that way, a transient time-variable pressure signal is applied to the flow sensors. Detecting blockage of the opening of the respective flow sensor can be enabled by analyzing the transient signal. In a static flow, the flow sensor cannot differentiate whether the opening is blocked. However, the transient time dependent signal applied to the flow sensor is different, depending on whether the opening is blocked or not. When the opening is not blocked, the pressure pulse generated by the micropump will be reduced again within several milliseconds. If the opening is blocked, overpressure builds up that cannot flow off. This can be detected by signal analysis of the flow sensor.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
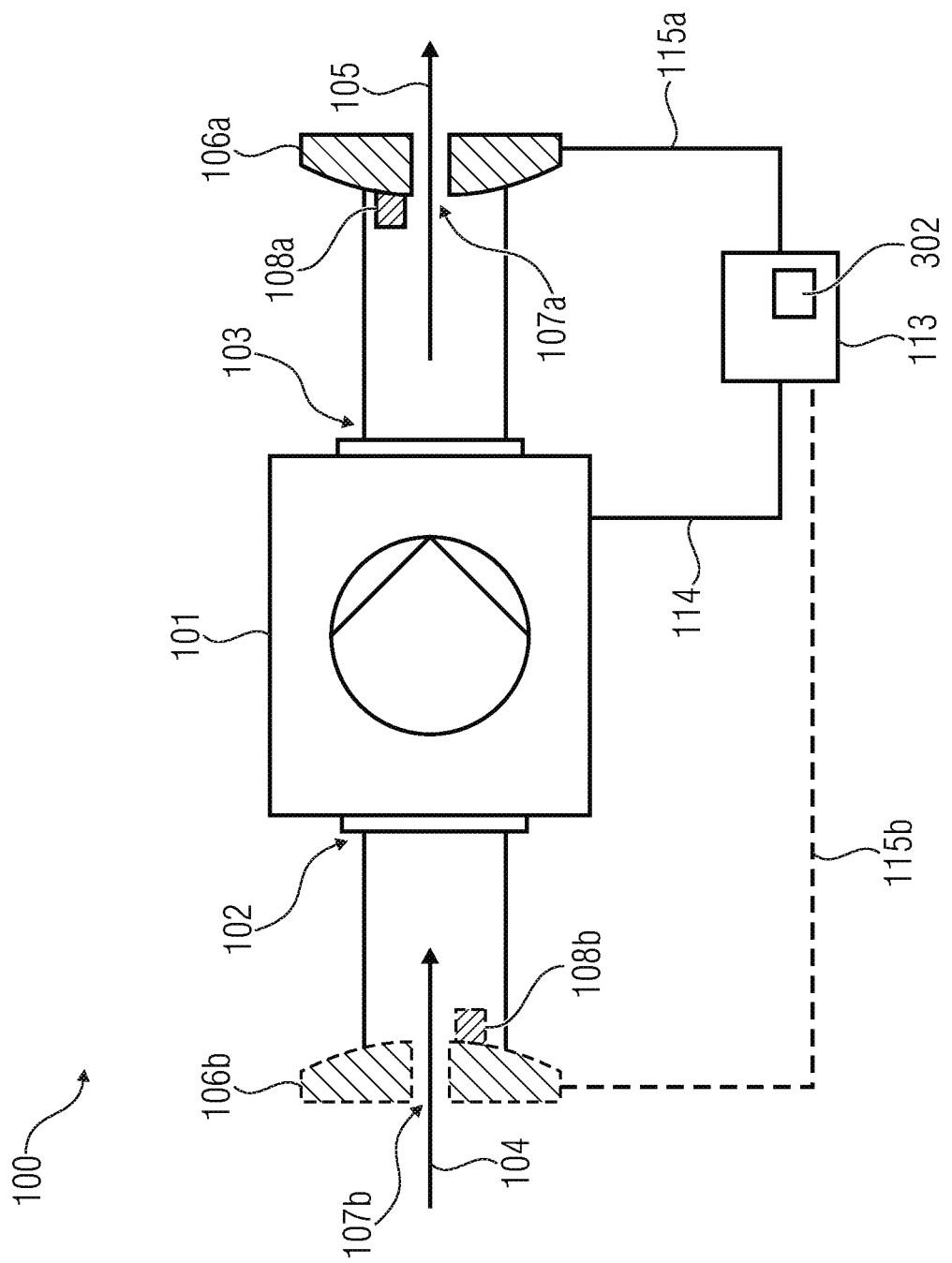
FIG. 1A is an inventive microdosing system.

FIG. 1A shows an inventive microdosing system 100 for dosing an amount of fluid to be dispensed. The fluid to be dispensed can, for example, by a gas or a liquid. The fluid can have different rheologic characteristics. For example, the fluid can have a low viscosity. The fluid having a low viscosity can, for example, be a cream or a lotion. The fluid can comprise medically active ingredients. The fluid can, for example, also be a deodorant solution containing scents.

The micodosing system 100 comprises a micropump 101. The micropump 101 comprises an inlet 102 and an outlet 103.

The micropump 101 is configured to suck the fluid to be dispensed, indicated by the arrow 104, through the inlet 102. Further, the micropump 101 is configured to dispense at least part of the fluid indicated by the arrow 105 from the outlet 103.

The microdosing system 100 comprises a first flow sensor 106a, 106b. The first flow sensor 106a is arranged on the outlet side, i.e., the same is on the side of the outlet 103 of the micropump 101. Optionally, instead of on the outlet side, the first flow sensor 106b can also be arranged on the inlet side, i.e., on the side of the inlet 102, which is why the first flow sensor 106b arranged optionally on the inlet side according to this option is indicated by dotted lines in FIG. 1A.

The first flow sensor 106a, 106b comprises an opening 107a, 107b. The fluid to be dispensed 104, 105 can pass through this opening 107a, 107b. Further, the first flow sensor 106a, 106b comprises a flow rate measuring means 108a, 108b. The flow rate measurement means 108a, 108b is configured to determine the flow rate of the fluid 104, 105 passing through the opening 107a, 107b configured in the first flow sensor 106a, 106b.

The opening 107a, 107b can also be referred to as orifice plate. The flow rate measuring means 108a, 108b can, for example, be a pressure sensor measuring the pressure applied in front of the orifice plate 107a, 107b as well as the pressure applied after the orifice plate and can determine the differential pressure. By means of the differential pressure, as described below, the flow rate that has passed through the orifice plate 107a, 107b can be determined.

By temporal integration of the flow rate, the flow rate and the volume of the fluid that has passed through can be determined. In that way, the microdosing system can dose the amount of fluid to be dispensed.

The opening and orifice plate 107a, 107b, respectively, forms a defined flow resistance for the passing fluid. The volume flow and the volume and mass flow, respectively, which flows through the flow resistor is a function of the pressure applied to the same. The volume flow Q is (in incompressible liquids having a viscosity that is not too high according to Toricelli's law) proportional to the square root of the differential pressure $\Delta p$ between the pressure $p_1$ measured prior to the orifice plate 107a, 107b and the pressure $p_2$ measured after the orifice plate 107a, 107b with the constant of proportionality c.

$$Q = c \cdot \sqrt{p_2 - p_1} = c \cdot \sqrt{\Delta p}$$

or generally:

$$Q = \mu A \sqrt{\frac{2\Delta p}{\rho}}$$

with the orifice plate area A and the density $\rho$ of the liquid. The discharge coefficient $\mu$ is composed of the coefficient of contraction $\lambda$ (describing the constriction of the flow path with at sharp edges of the orifice plate) and the coefficient of velocity $\xi$ (describing the influence of the (small) friction losses at the orifice plate).

$$\mu = \lambda \xi$$

Further, it is a prerequisite of the above root Toricelli relation that the opening 107a, 107b is an "orifice plate", i.e., that the diameter (or the typical dimension with a non-round, e.g., square orifice plate) of the opening 107a, 107b is significantly greater than the thickness of the orifice plate 107a, 107b. This is the case, for example, when the opening 107a, 107b of the flow sensor 106a, 106b is realized, for example, by a dry etching step on the pressure sensor membrane of silicon, normally having a membrane thickness of 10 . . . 50 μm and a typical membrane side lengths of 1 . . . 3 mm and the diameter of the orifice plate 107a, 107b has a value of 50 . . . 1500 μm. When the diameter of the opening 107a, 107b is significantly greater than the thickness of the orifice plate 107a, 107b, the potential energy of the fluid is mainly converted to kinetic energy, which results in the above Toricelli's law. In that case, the influence of friction at the orifice plate flow is small, which has the advantage that the liquid flow through the orifice plate 107a, 107b is essentially temperature-independent since the density is essentially temperature-independent, while the viscosity of liquids is extremely temperature-dependent. Here, it is an advantage that (due to the steep root characteristic in small sensor signals) the flow sensor 106a, 106b is less sensitive at small flow values.

When the diameter of the orifice plate 107a, 107b is not significantly greater than the thickness of the orifice plate 107a, 107b, the influence of friction increases. The root characteristic will then get a linear portion. However, this is insignificant for the function of the microdosing system since in this case also the context between pressure sensor signal and flow can be determined. Since the influence of temperature on the viscosity is also known, this temperature influence can be measured and compensated by measuring the temperature (as described above already for gas flow). Further, a channel flow has the advantage that an approximately linear context results between flow and pressure drop, which is generally known for round channel geometries due to the Hagen-Poiseuill equation.

Thereby, it is, for example, possible to realize orifice plate diameters that are equal to or smaller than the orifice plate thickness (whereby the orifice plate becomes a channel), and in that way microdosing systems 100 can be realized which can monitor and dose very small amounts.

The volume flow and the flow rate Q, respectively, is additionally the time derivative of the volume of the fluid to be dispensed flowing through the defined flow resistance (corresponding to the cross-section of the orifice plate opening 107a, 107b) during a time unit.

$$Q = \dot{V} = \frac{dV}{dt}$$

Integrating the volume flow Q results in the volume of the medium that has passed during this time period.

$$V = \int_{t_1}^{t_2} Q dt$$

As mentioned above, a fluid to be dispensed can also be a gas. In that case, the volume of the gas changes with the temperature. Thus, it can be advantageous when the micodosing system 100 comprises a temperature sensor (not illustrated herein) that is configured to determine the temperature of the gas passing through the orifice plate opening 107a, 107b in order to determine the respective volume of the gas. Advantageously, the temperature sensor is integrated in the first flow sensor 106a,106b. When the first flow sensor 106a, 106b is configured, for example, as a microflow sensor in the form of a semiconductor chip, the temperature sensor can also be configured in this semiconductor chip.

Additionally, the microdosing system 100 comprises means 113 for calibrating and/or detecting faults of the microdosing system 100. This means 113 is configured to recalibrate the first flow sensor 106a, 106b when needed at any time, or to re-determine the current zero point when needed in order to counteract an undesired sensor drift. Additionally, the means 113 is configured to detect a fault of the microdosing system 100. The means can be connected, for example, via signal lines 114, 115a, 115b, to the micropump 101 and the first flow sensor 106a, 106b arranged on the outlet side and the inlet side, respectively.

The means 113 for calibrating and/or detecting faults of the microdosing system 100 includes a control means 302. The control means 302 is configured to detect an actual value of the sensor signal of the first flow sensor 106a, 106b when the micropump 101 is inactive and to set the same as current zero value. The control means 302 as a component of the means for calibrating and/or detecting faults of the microdosing system 100 switches the micropump 101 into an inactive state, i.e., the micropump 101 performs neither suction stroke nor a pressure stroke. In this inactive state of the micropump 101, no fluid to be dispensed flows between the inlet 102 and the outlet 103.

It may happen that the sensor signal of the first flow sensor 106a, 106b drifts, i.e., the value of a sensor signal considered at a time $t_1$ changes over time, such that this sensor signal has a different value at a second time $t_2$ compared to the previous time $t_1$. This can, for example, be induced by mechanical stress when housing low-cost sensors.

Thus, the control means 302 can detect the current sensor value of the first flow sensor 106a, 106b at any time $t_0$ and set the same as new zero value. In other words, the current sensor value can be subtracted from the measurement signal as offset in an immediately subsequent flow measurement of the first flow sensor 106a, 106b by means of the flow measuring means 108a, 108b. In that way, the microdosing system 100 is recalibrated by means of the means for calibrating and/or detecting faults prior to a measurement.

The control means 302 is configured to determine a correction value and to subtract the same from the amount of the detected actual sensor signal of the first flow sensor 106a, 106b, wherein the obtained difference value forms a corrected starting point for the subsequent sensor signals of the first flow sensor 106a, 106b.

Thus, when the control means 302 determines that no flow is flowing (e.g., when the micropump is inactive and/or the microvalves are closed), the first flow sensor 106a, 106b is calibrated and "set to zero", respectively, by the means for calibrating and/or detecting faults. For example, the control means 302 can detect the present actual value of the first flow sensor 106a, 106b and correct the same by means of a correction value in order to set the resulting signal as current "zero flow value" and zero point or starting point, respectively.

The correction value is determined by the control means 302 and is based on the detected actual sensor signal of the first flow sensor 106a, 106b. The correction value is subtracted from the detected actual sensor signal. The obtained difference value serves as new starting point for subsequent sensor signals. In other words, the present actual sensor signal is set as new "zero signal". This new "zero signal" can be subtracted from the measurement signal as offset in an immediately subsequent measurement of the flow sensor where the flow sensor has not yet drifted away again.

The correction value can correspond, for example, to the amount of the measured actual sensor signal and can be subtracted from the same. If, for example, when the pump is inactive, an actual sensor signal of ±50 mV is measured due to sensor drift, a correction value in the amount of 50 mV can be subtracted from the amount of the actual sensor signal. This means the amount of the actual value of the sensor signal in the amount of ±50 mV is corrected by the correction value in the amount of also 50 mV. Thus, the drifting sensor signal is reset to the value zero.

Prior to performing a measurement of a sensor signal of the first flow sensor 106a, 106b, the correction value can be subtracted from the previously detected actual sensor signal. In that way, the "zero point" is redetermined. However, it is also possible that the actual sensor value is at first stored as correction value and subtracted from this measured sensor signal only after performing a measurement. In this case, the correction value is subtracted from the obtained measurement value as offset only after the measurement has been performed.

Independent of whether the correction value is subtracted from the respective sensor signal prior to or after a measurement, the amount of the sensor drift can, if the sensor signal of the flow sensor is subject to a time-variable sensor drift, be set to zero by the means for calibrating and/or detecting faults at any time $t_0$. As it were, the sensor drift at the time $t_0$ is hidden and corrected, respectively, and the current zero point of the flow sensor is redetermined at the time $t_0$.

The amount of the correction does not have to correspond exactly to the amount of the actual sensor signal. It is also possible that the amount of the correction value has any value between zero and the actual value of the sensor signal. If, for example, an actual sensor signal of ±50 mV is measured due to sensor drift, a correction value having any value between 0 mV and 50 mV can be subtracted from the amount of the actual sensor signal. In that case, it would be, for example, possible that a correction value in the amount of 40 mV is subtracted from the amount of the measured actual sensor signal in the amount of ±50 mV. Accordingly, a new difference value of 1 mV would result, which is used a new starting point and as "zero point", respectively, for subsequent measurements.

It is also possible that the correction value is within a range of the amount of the actual sensor signal plus a tolerance value of ±10% of the actual sensor signal or plus a tolerance value of ±20% of the actual sensor signal. Accordingly, for example, for an actual sensor signal value of ±50 mV, a correction value $x_1$ in the range of 50 mV±10%, i.e., 45 mv<$x_1$<55 mV, or a correction value $x_2$ in the range of 50 mV±20%, i.e., 40 mv<$x_2$<60 mV could be selected.

The control means 302 is configured to perform calibration of the microdosing system 100 prior to each pump stroke. Accordingly, the control means 302 can perform calibration prior to a suction stroke and/or prior to a pressure stroke of the micropump 101 as described above.

Prior to calibration of the microdosing system 100 it should be ensured that no free flow or merely a negligibly small flow of the fluid 104, 105, 109 takes place between inlet 102 and outlet 103 in order to be able to sufficiently compensate the drifting sensor signal. This can be ensured, among others, in that the microdosing system 100 has, according to the invention, a lower pressure on the inlet side than on the outlet side. For example, a reservoir 201 described below with reference to FIGS. 2A and 2B in more detail can be provided, wherein the fluid level in the reservoir 201 is to be kept below a fluid level at the outlet at all times. In this consideration, it is not relevant whether the connecting liquid-filled fluid channels (e.g., 225) are above or below the fluid level at the inlet or the fluid level at the outlet. In that way, the hydrostatic pressure in the reservoir is not sufficient to allow free fluid flow between inlet 102 and outlet 103. In this constellation, with regard to the pressure ratios, a reverse flow from the outlet 103 back to the inlet 102 would basically be possible, but the passive check valves 310, 311 of the micropump 101 (see FIG. 3) are reverse-biased and prevent backflow, such that it is ensured that no flow (or only a negligible leakage flow) flows.

However, both a reservoir 201 arranged on the inlet side and a reservoir arranged on the outlet side can be provided. The fluid pressures of the two reservoirs can be configured such that the same have the same size. In that case, the microdosing system 100 would have approximately the same pressure on the inlet side as on the outlet side. Thereby, free fluid flow between inlet 102 and outlet 103 is also prevented.

If the microdosing system has a higher pressure on the inlet side than on the outlet side, constructional measures could be taken for preventing free fluid flow between inlet 102 and outlet 103. According to the embodiment shown in FIG. 1B, an additional valve 140a, 140b can be provided. The valve 140a can be arranged on the outlet side. The valve 140b can alternatively be arranged on the inlet side. Also, one valve 140a, 140b each can be provided on the outlet side and on the inlet side.

The valve 140a, 140 can be closed, such that fee fluid flow between the inlet 102 and the outlet 103 can be prevented. The valve 140a, 140 can be an active normally closed valve as known, for example, from EP 1 320 686 B1. The valve 140a, 140b can be a valve with operating threshold pressure which is tight below a threshold pressure as known, for example, from DE 10 2008 035 990 A1. The valve 140a, 140b can be a so-called double normally closed microvalve, such as known from EP 1 576 296 B1. The valve 140a, 140b can also be a so-called safety valve as known from EP 2 220 371 B1.

Figure 1B:
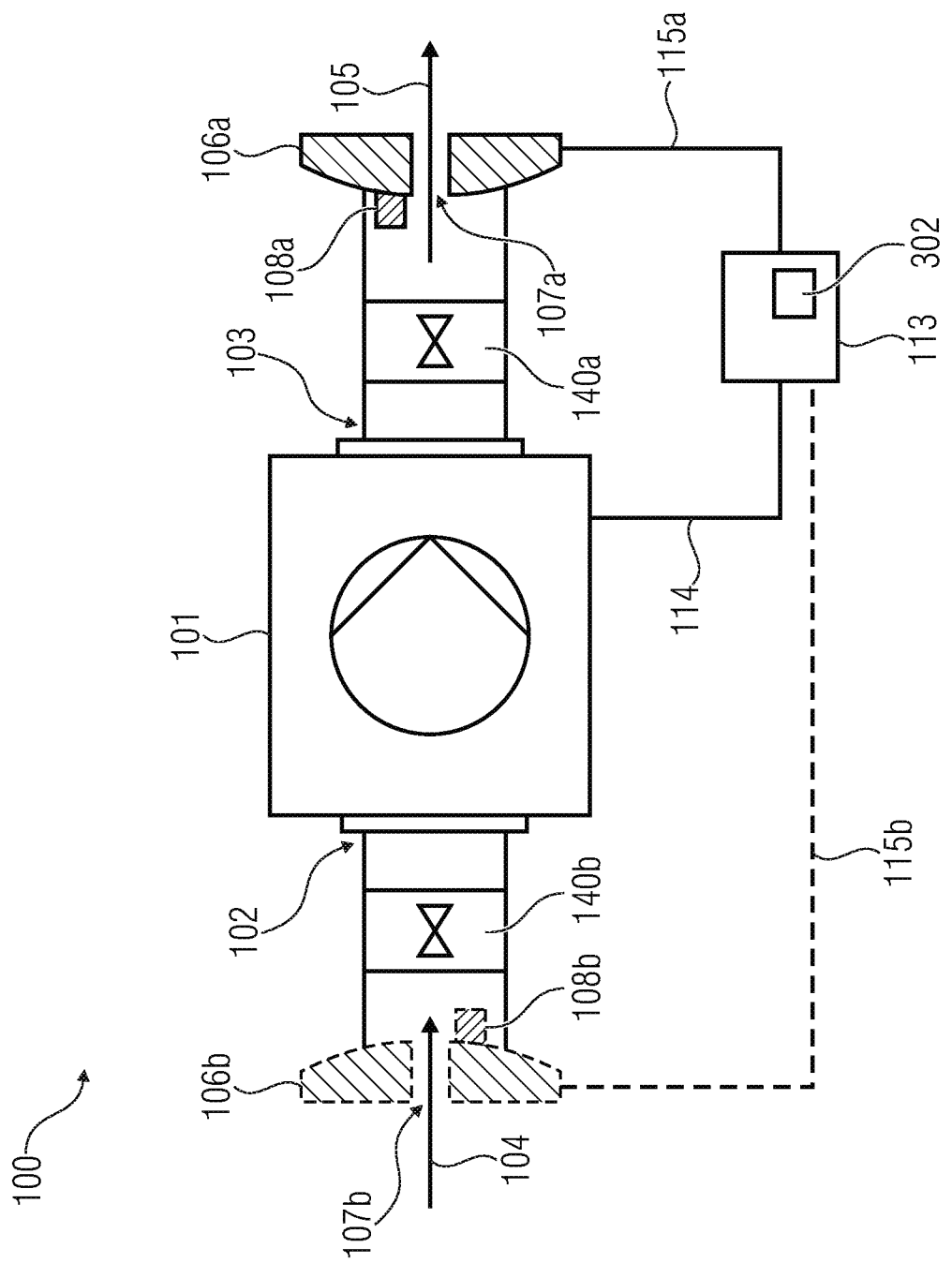
FIG. 1B is a further embodiment of an inventive microdosing system.

As shown in FIG. 1B, the valve 140b provided on the inlet side can be arranged between the micropump 101 and the flow sensor 106b arranged on the inlet side. The valve 140b provided on the inlet side can alternatively and advantageously also be arranged before the flow sensor 106b arranged on the inlet side in flow direction. This is advantageous since thereby the dead volumes, the fluidic capacitances and the fluidic inductances between flow sensor 106b and micropump 101 are not enlarged. The valve 140a provided on the outlet side can be arranged, as illustrated in FIG. 1B, between the micropump 101 and the flow sensor 106a arranged on the outlet side. The valve 140a provided on the outlet side can alternatively also be arranged in flow direction after the flow sensor 106a arranged on the outlet side.

As an alternative or in addition to the valves 140a, 140b, the micropump 101 can comprise passive check valves for preventing backflow of the fluid, i.e., from the outlet 103 to the inlet 102. These check valves 310, 311 will be described in more detail below with reference to FIG. 3.

As an alternative or in addition to the valves 140a, 140b, the micropump 101 can comprise active inlet and outlet valves for preventing backflow of the fluid, i.e., from the outlet 103 to the inlet 102 by closing the active valves.

Such a micropump having an active inlet valve and an active outlet valve is known, for example, from DE 102 38 600 A1.

Figure 2A:
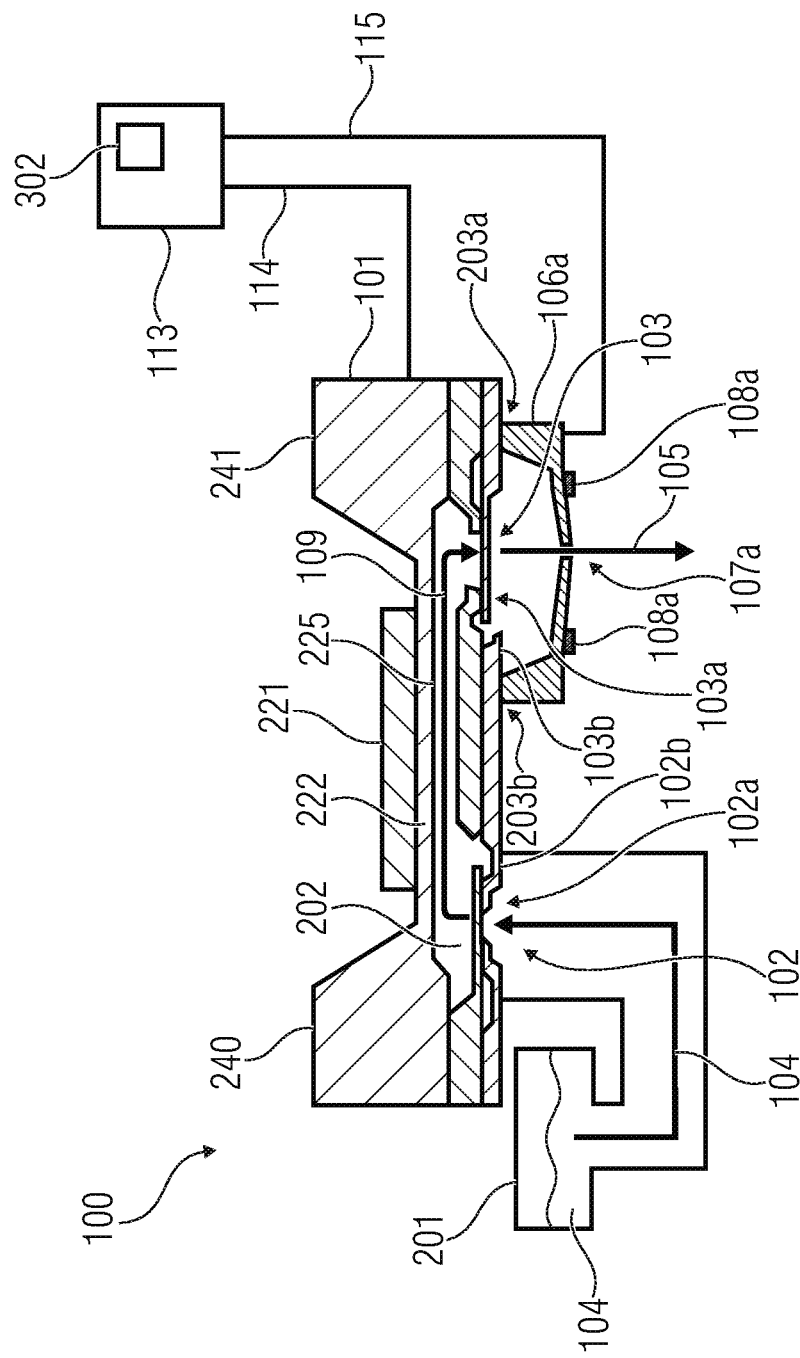
FIG. 2A is a side sectional view of an inventive microdosing system according to a further embodiment.

With the help of such a micropump having active valves, apart from backflow of the fluid, forward flow of the fluid (free flow) can also be prevented, when one of the active valves or both valves are actively closed. First, FIG. 2A shows a further embodiment of an inventive microdosing system 100. The microdosing system 100 comprises a micropump 101. The micropump 101 comprises an inlet 102 and an outlet 103.

More precisely, the inlet 102 comprises an inlet opening 102a and an edge portion 102b surrounding the inlet opening 102a. The outlet 103 comprises an outlet opening 103a and an edge portion 103b surrounding the outlet opening 103a. In the embodiment shown in FIG. 2A, the edge portion 102b surrounding the inlet opening 102a and the edge portion 103b surrounding the outlet opening 103a are integrally formed.

The micropump 101 is configured to suck the fluid to be dispensed, indicated by the arrow 104, through the inlet 102. Further, the micropump 101 is configured to dispense at least part of the fluid, indicated by arrow 105, from the outlet 103.

At the micropump 101, a reservoir 201 storing the fluid 104 to be dispensed can be arranged on the inlet side. The reservoir 201 is arranged such that the fluid level within the reservoir 201 is below the lowest edge of the fluid channel 225 that connects the inlet 102 to the outlet 103. In that way, the hydrostatic pressure of the fluid stored in the reservoir 201 is not sufficient to allow free fluid flow between the inlet 102 and the outlet 103.

In the embodiment shown in FIG. 2A, the microdosing system 100 further comprises a first flow sensor 106a arranged on the outlet side. The first flow sensor 106a comprises an opening 107a through which the fluid 105 to be dispensed can pass. Further, the first flow sensor 106a comprises a flow rate measuring means 108a. The flow rate measuring means 108a is configured to determine the flow rate of the fluid 105 passing through the opening 107a formed in the first flow sensor 106a.

According to this embodiment, the first flow sensor 106a is arranged in contact with the outlet 103 of the micropump 101 on the outlet side and at least in sections. More accurately, the portions 203a, 203b of the first flow sensor 106a facing the micropump 101 are in contact with the edge portion 103b of the outlet 103 surrounding the outlet opening 103a.

The microdosing system 100 comprises means 113 for calibrating and/or detecting faults of the microdosing system 100. The means 113 for calibrating and/or detecting faults includes a control means 302. The means 113 for calibrating and/or detecting faults corresponds to the means 113 for calibrating and/or detecting faults discussed before with reference to FIGS. 1A and 1B and hence has essentially the same functionality. Among others, it serves to calibrate the microdosing system 100 prior to a pump stroke by setting the flow sensor 106, here arranged on the outlet side, to zero. For this, when the micropump 101 is inactive, the control means 302 detects the current sensor signal of the flow sensor 106 and determines this sensor signal as new zero value. Thus, drifting of the sensor signal can be compensated prior to each pump stroke.

Figure 2B:
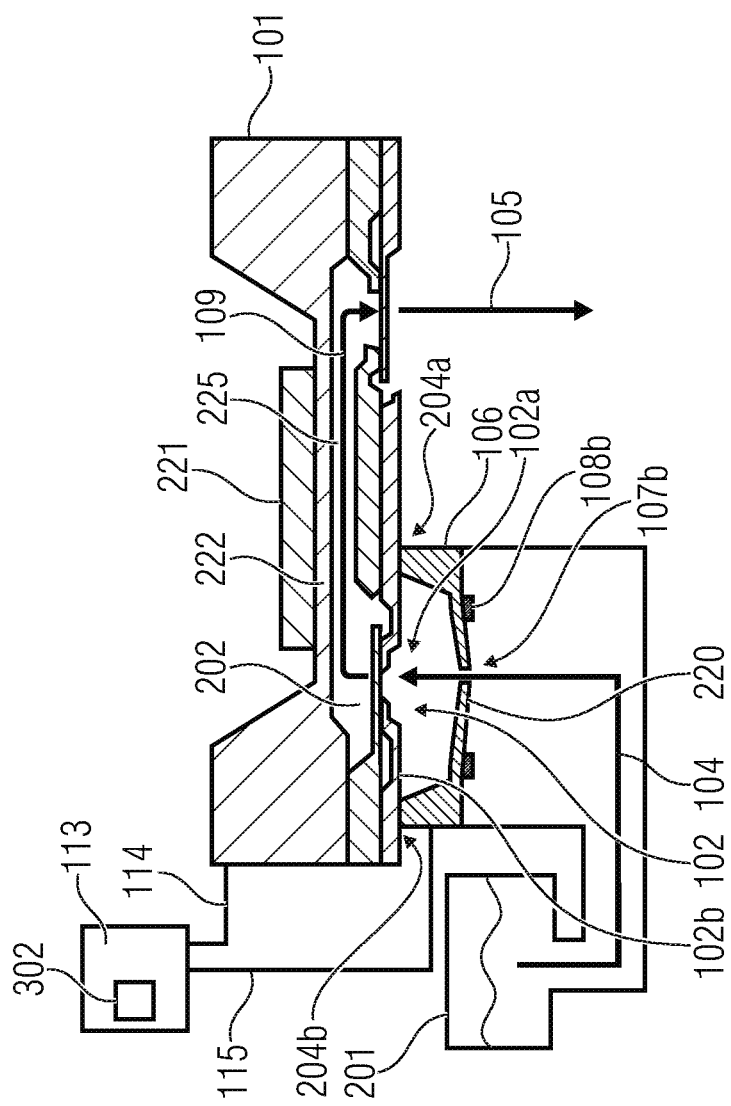
FIG. 2B is a side sectional view of an inventive microdosing system according to a further embodiment.

FIG. 2B shows an alternative embodiment of an inventive microdosing system 100 where the first flow sensor 106b is arranged on the inlet side.

The micropump 102 is configured to suck the fluid to be dispensed, indicated by the arrow 104, through the inlet 102. The micropump 101 is further configured to dispense at least part of the fluid, indicated by the arrow 105, from the outlet 103.

A reservoir 201 storing the fluid to be dispensed can be arranged on the inlet side at the micropump 101. In that case, the first flow sensor 106b is arranged between the reservoir 201 and the inlet 102 of the micropump 101. Here, the reservoir 201 is also arranged such that the fluid level within the reservoir 201 is below the lowest edge of the fluid channel 225 that connects the inlet 102 to the outlet 103. In that way, the hydrostatic pressure of the fluid stored in the reservoir 201 is not sufficient to allow free fluid flow between the inlet 102 and the outlet 103.

The micropump 101 sucks the fluid to be dispensed from the reservoir 201. The first flow sensor 106b comprises an opening 107b through which the fluid to be dispensed 104 can pass. Subsequently, the fluid to be dispensed 104 enters the micropump 101 through the inlet opening 102a of the inlet 102.

Further, the first flow sensor 106b comprises a flow rate measuring means 108b. The flow rate measuring means 108b is configured to determine the flow rate of the fluid 104 passing through the opening 107b formed in the first flow sensor 106b.

According to this embodiment, the first flow sensor 106b is arranged in contact with the inlet 102 of the micropump 101 on the inlet side and at least in sections. More accurately, the portions 204a, 204b of the first flow sensor 106b facing the micropump 101 are in contact with the edge portion 102b of the inlet 102 surrounding the inlet opening 102a.

Here, the microdosing system 100 also comprises means 113 for calibrating and/or detecting faults of the microdosing system 100, wherein the means 113 corresponds to the means 113 for calibrating and/or detecting faults described above with reference to FIGS. 1A, 1B and 2A.

The micropump 101 comprises a pump chamber 202 arranged between the inlet 102 and the outlet 103. The micropump 101 is configured to pump the fluid to be dispensed through the pump chamber 202, as indicated by arrow 109.

Figure 3:
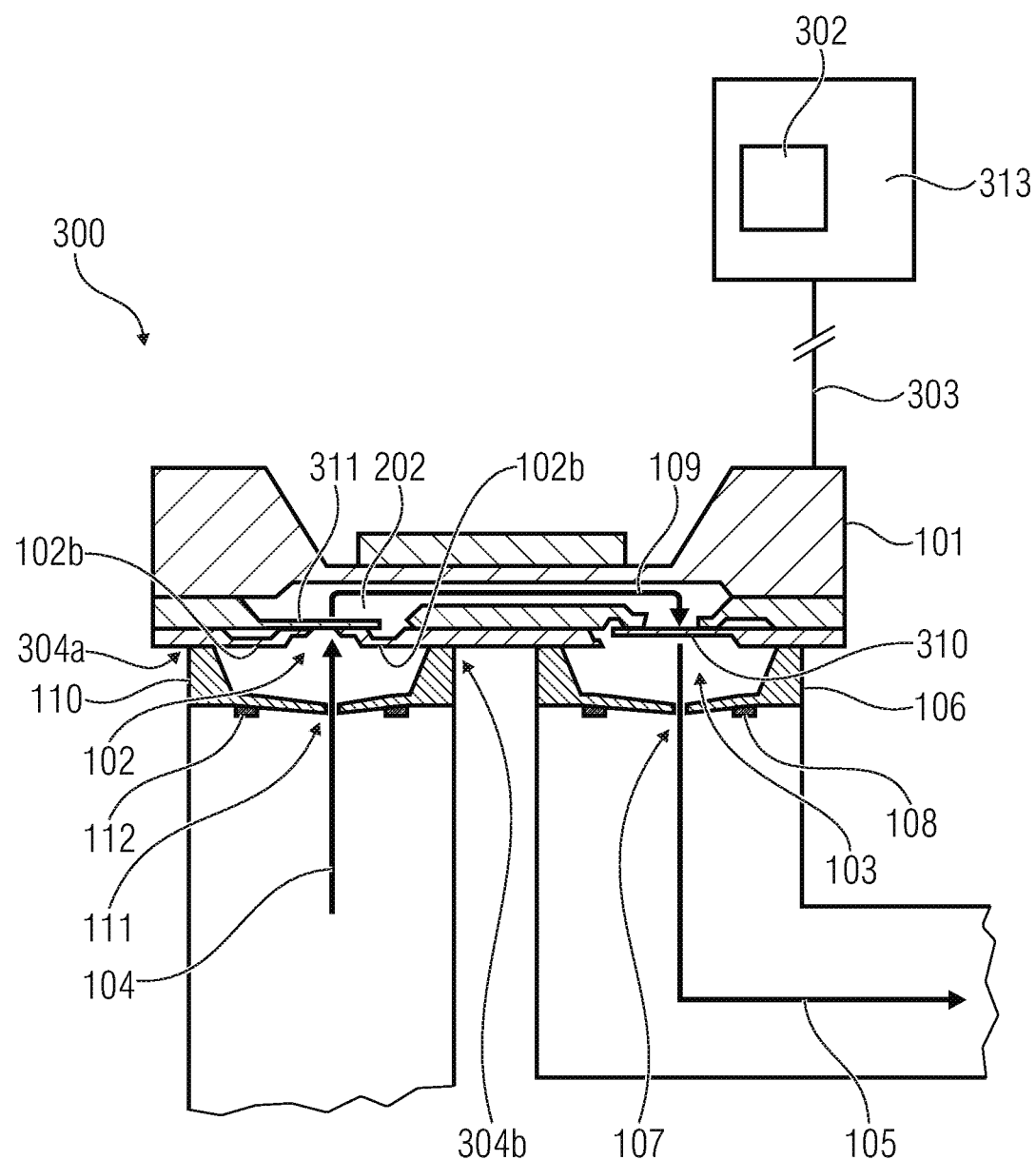
FIG. 3 is a side sectional view of an inventive microdosing system according to a further embodiment.

FIG. 3 shows a further embodiment of an inventive microdosing system 300 where the first flow sensor 106 is arranged on the outlet side and the second flow sensor 110 is arranged on the inlet side.

The second flow sensor 110 comprises an opening 111 and a flow rate measuring means 112. The flow rate measuring means 112 is configured to determine the flow rate of the fluid 104 passing through this opening 112.

According to this embodiment, the second flow sensor 110 is arranged in contact with the inlet 102 of the micropump 101 on the inlet side and at least in sections. More accurately, the portions 304a, 304b of the second flow sensor 110 facing the micropump 101 are in contact with the edge portion 102b of the inlet 102 surrounding the inlet opening 102.

On the outlet side, the micropump 101 comprises a valve 310 that is configured to close the outlet 103 when the micropump 101 sucks the fluid to be dispensed 104. Further, the valve 310 is configured to open the outlet 103 when the micropump 101 dispenses the fluid to be dispensed 105 from the outlet 103.

On the inlet side, the micropump 101 comprises a valve 311 that is configured to open the inlet 102 when the micropump 101 sucks the fluid to be dispensed 104, and that it is configured to close the inlet 102 when the micropump 101 dispenses the fluid to be dispensed 105 from the outlet 103.

The microdosing system 300 comprises means 313 for calibrating and/or detecting faults of the microdosing system 300 whose function essentially corresponds to the embodiments described above with reference to FIGS. 1A to 2B. The means 313 for calibrating and/or detecting faults of the microdosing system 300 includes a control means 302. The control means 302 is configured to control the first flow sensor 106 arranged on the outlet side and/or the second flow sensor 110 arranged on the inlet side. The control means 302 can, for example, be a suitable micro controller. The control means 302 is connected to the microdosing system 300 via a wired or wireless connection 303. The control means 302 is connected to the micropump 101 as well as to the first and/or second flow sensor 106, 110.

Apart from the above stated option for calibrating the microdosing system 300 by "setting to zero" the flow sensor 106 arranged on the inlet side and/or the flow sensor 110 arranged on the outlet side, the means 313 for calibrating and/or detecting faults of the microdosing system 300 are configured to detect a fault of the microdosing system 300. Such faults will be discussed in more detail below in the text.

For example, a leakage of the valve 310 of the micropump arranged on the inlet side and/or the valve 311 of the micropump 101 arranged on the outlet side can be detected. However, also, a leakage and malfunction, respectively, of the flow sensor 110 arranged on the inlet side and/or the flow sensor 106 arranged on the outlet side can be detected.

For such fault detection purposes, the control means 310 is, among others, configured to control the micropump 101 as well as the first flow sensor 106 arranged on the outlet side and the second flow sensor 110 arranged on the inlet side such that both the first and the second flow sensor 106, 110 determine the flow rate of the fluid 104, 105 flowing through the respective opening 107, 111 of the first and second flow sensor 106, 110, when the micropump 101 sucks the fluid to be dispensed 104.

This means during sucking and in the suction stroke of the micropump 101, respectively, the fluid 104 on the inlet side flows through the opening 111 of the second flow sensor 110 arranged on the inlet side. During the suction stroke of the micropump 101, the valve 311 arranged on the inlet side opens and the fluid to be dispensed can flow into the pump chamber 202 which is indicated by the arrow 109.

At the same time, in the suction stroke of the micropump 101, the valve 310 arranged on the outlet side closes the outlet 103. An intact valve 310 closes the outlet 103 in a fluid-tight manner. If the valve 310 arranged on the outlet side is defect, fluid will flow back into the pump chamber 202 and will also flow back through the outlet 103 through the first flow sensor 106. This discharged fluid flows back through the opening 107 of the first flow sensor 106 arranged on the outlet side and the flow rate of this discharged fluid is determined by means of the flow rate measuring means 108.

Here, it should be noted that the pressure sensor membrane of the flow rate measuring means 108 can also detect a backflow, since in this case the pressure difference at the orifice plate 107 of the flow sensor 106 is negative and a negative voltage is measured on the Wheatstone bridge.

Thus, the control means 302 knows that the pump 101 is in the suction stroke and hence no flow should be measurable at the flow sensor arranged on the outlet side, since the valve 310 on the outlet side should close the outlet in a fluid-tight manner. If the control means 302 still measures a flow at the flow sensor 106 arranged on the outlet side, this indicates a defect, e.g. a leakage at the valve 310 on the outlet side. Thus, the means 313 for calibrating and/or detecting faults of the microdosing system 300 can detect a leakage flow on the outlet side. The control means 302 as part of the means 313 for calibrating and/or detecting faults of the microdosing system 300 can detect a fault of the microdosing system 300 in the suction stroke of the micropump 301.

Further, the control means 302 is configured to compare the flow rate determined by the first flow sensor 110 and the flow rate determined by the second flow sensor 106.

The microdosing system 300 cannot only detect leakage flow of the valve 310 arranged on the outlet side in the suction stroke of the micropump 101. The microdosing system 300 can also detect leakage flow of the valve 311 arranged on the inlet side in the pressure stroke of the micropump 101.

For this, the control means 302 is configured to control the micropump 101 as well as the second flow sensor 110 arranged on the inlet side such that the second flow sensor 110 determines the flow rate of the fluid 104 flowing through the opening 111 of the second flow sensor 110, when the micropump 101 dispenses the fluid to be dispensed 105 from the outlet 103.

This means when discharging the fluid 105 and in the pressure stroke of the micropump 101, respectively, the valve arranged on the outlet side 310 opens and the fluid to be dispensed 109 residing in the pump chamber 202 can flow through the outlet 103 out of the pump chamber 202 in the direction of the first flow sensor 106 arranged on the outlet side, which is indicated by the arrow 105. Then, the fluid to be dispensed 105 flows through the opening 107 of the first flow sensor 106 arranged on the outlet side. The flow rate of the fluid to be dispensed 105 is thereby determined by means of the flow rate measuring means 108.

At the same time, the valve 311 arranged on the inlet side closes the inlet 102 in the pressure stroke of the micropump 101. An intact valve 311 closes the inlet 102 in a fluid-tight manner. If the valve 311 arranged on the inlet side is defect, fluid will flow out of the pump chamber 202 through the inlet 102 back into the second flow sensor 110 arranged on the inlet side. This fluid that has flowed back passes the opening 111 of the second flow sensor 110 and the flow rate of this fluid that has flowed back is determined by means of the flow rate measuring means 112. The control means 302 knows that the pump 101 is in the pressure stroke and hence no flow should be measurable at the second flow sensor 110 arranged on the inlet side, since the valve 311 on the inlet side should close the inlet 102 in a fluid-tight manner. If the control means 320 still measures a flow at the second flow sensor arranged on the inlet side, this indicates a defect, e.g. a leakage at the valve 311 on the inlet side. The means 313 for calibrating and/or for detecting faults of the microdosing system 300 can hence detect leakage flow on the inlet side. The control means 302 as part of the means 313 for calibrating and/or detecting faults of the microdosing system 300 can also detect a fault of the microdosing system 300 in the pressure stroke of the micropump 101.

Above that, the inventive microdosing system 300 can detect leakage flows at the valve 311 on the inlet side and/or the valve 310 on the outlet side when the micropump 101 is inactive or idle, i.e. neither performs a suction stroke nor a pressure stroke.

For this, the control means 302 is configured to control the micropump 101 and the first and/or the second flow sensor 106, 110 such that the first and/or the second flow sensor 106, 110 determines the flow rate of the fluid 104, 105 flowing through the opening 107, 111 of the first and/or second flow sensor 106, 110 when the micropump 101 is not operated.

When the micropump 101 is inactive and not operated, respectively, no negative pressure and overpressure, respectively, exists in the pump chamber 202. Thus, the fluid to be dispensed is at atmospheric pressure in the pump chamber 202. In this state, both the valve 311 on the inlet side and the valve 310 on the outlet side are closed in a fluid-tight manner.

If fluid residing in the pump chamber 202 still leaks from the pump chamber 202, this leaking fluid will flow to the first and the second flow sensor 106, 110, respectively, and to the opening 107, 111 of the first and second flow sensor 106, 110, respectively, depending on which of the two valves is leaking. The flow rate of the leaking fluid is determined by means of the respective flow rate measuring means 108, 112.

Since the control means 302 knows that the micropump 101 is in an inactive state, a fluid flow detected by the first and/or second flow sensor 106, 110 is detected as error and fault, respectively, of the microdosing system 300. The control means 302 as part of the means 313 for calibrating and/or detecting faults generates the information that the valve 311 on the inlet side and/or the valve 310 on the outlet side are leaking, and which of the two valves 310, 311 is leaking. Due to the flowrate of the leaking fluid determined by means of the respective flow rate measuring means 108, 112, even the respective leakage rate of a leaking valve 310, 311 can be determined. The control means 302 as part of the means 313 for calibrating and/or detecting faults of the microdosing system 300 can thus detect a fault of the microdosing system 300 even when the micropump 101 is inactive.

In the suction stroke of the micropump 101, the microdosing system 300 can determine the pump stroke volume based on the flow rate of the fluid determined by the flow sensor 110 arranged on the inlet side. The microdosing system 300 receives information on how much fluid has flowed through the flow sensor 110 arranged on the inlet side during the suction stroke and how much is in the pump chamber 202 accordingly.

In the pressure stroke of the micropump 101, the microdosing system 300 can determine the pump delivery volume based on the flow rate of the fluid determined by the flow sensor 106 arranged on the outlet side. The microdosing system 300 receives information on how much fluid has flowed through the flow sensor 110 arranged on the outlet side and hence out of the pump chamber 202 during the pressure stroke.

If the flow rate measuring means 108, 112 provided for determining the flow rate are configured as differential pressure sensors, the respective fluid volume can be determined by means of integrating the flow rate Q according to the above stated formula. By integrating the flow rate $Q_{in}$ determined by means of the different pressure sensor 110 on the inlet side, the stroke volume of the pump 101 in the suction stroke can be determined. By integrating the flow rate $Q_{out}$ determined by means of the different pressure sensor 106 arranged on the outlet side, the stroke volume of the pump 101 in the pressure stroke can be determined. The control device 302 can compare both stroke volumes to one another. Possible volume stroke differences show, for example, a measurement error or leakages.

The leakage rate of a valve 310, 311 determined in the inactive state of the micropump 101 can be used as difference value with respect to the determined pump stroke volume and the determined pump delivery volume, respectively, for calibrating the microdosing system 300. This means the determined value of a detected leakage rate can be used as offset for a subsequent measurement of the flow rate of a fluid flowing through the opening 107, 111 of flow sensor 106, 110. The control means 302 as part of the means 313 for calibrating and/or detecting faults of the microdosing system 300 can thus also calibrate the microdosing system 300 even when the valve 310, 311 on the inlet side and/or on the outlet side is leaking.

This type of calibration works also for a microdosing system 100 as shown in FIGS. 1A, 1B, 2A and 2B, wherein this microdosing system 100 comprises, compared to the microdosing system 300 discussed with reference to FIG. 3, merely a first flow sensor 106 which can be arranged on the outlet side or on the inlet side. Accordingly, such a microdosing system 100 provided with a means 113 for calibrating and/or detecting faults can detect a leakage flow of a valve 106, 110 on the inlet side or on the outlet side.

For this, the microdosing system 100 comprises a control means 302 as part of the means 113 for calibrating and/or detecting faults of the microdosing system 100 that is configured to control the micropump 101 and the first flow sensor 106a, 106b such that the first flow sensor 106a, 106b determines the flow rate of the fluid 104, 105 flowing though the opening 107a, 107b of the first flow sensor 106a, 106b when the micropump is not operated.

Further, all embodiments of the inventive microdosing system 100, 300 have the advantage that the same can be calibrated for compensating a possible drift of the first and/or second flow sensor 106, 110 as described above.

When it is ensured, for example, based on the control means 302 that no fluid flow takes place, e.g. when the micropump 101 is switched off, the first flow sensor 106 is "set to zero", i.e. the flow rate measuring means 108 is read out and this read-out value is assumed as "zero flow value" and/or zero point or starting point, respectively. Thereby, the zero point can be redetermined prior to each suction stroke and/or pressure stroke of the micropump 101.

Thus, the first flow sensor 106 can be recalibrated prior to each suction and/or pressure stroke of the micropump 101 or in certain time periods. This counteracts a possible sensor drift of the first flow sensor 106. Thus, a low-cost sensor that has not been assembled with expensive assembly methods and has possibly even been housed under mechanical stress can also be used as exact flow sensor 106 suitable for the inventive microdosing system 100, 300. This applies both to a first flow sensor 106a arranged on the inlet side and for a flow sensor 106b arranged on the outlet side. The same applies accordingly to the second flow sensor 110.

According to an embodiment, the control means 302 is configured to compare the flow rate determined through the opening 107 of the first flow sensor 16 with a predetermined flow rate comparison value and to control the micropump 101 so long until the flow rate determined through the opening 107 of the first flow sensor 106 is equal to or greater than the predetermined flow rate comparison value.

In that way, the amount of fluid to be dispensed can be exactly dosed with the inventive microdosing apparatus 100, 300. When, for example, a dispense amount of a fluid of 1.0 µl is desired, and the micropump 101 can deliver a maximum of 0.25 µl per pump stroke, the control device 302 controls the micropump 101 until the desired dispense amount of 1.0 µl is reached. In an intermittingly operating micropump 101, this would be four pump strokes all in all.

Concerning the following more detailed description of the micropump 101, reference is made again to FIGS. 2A and 2B. According to this embodiment, the micropump 101 of the inventive microdosing system 100, 300 comprises a pump chamber 202 arranged between the inlet 102 and the outlet 103.

Additionally, the micropump 101 comprises a membrane 222 arranged at least in sections in the region of the pump chamber 202 and a membrane deflection means 221. The membrane deflection means 221 is configured to deflect the membrane 222 such that the volume of the pump chamber 202 is enlarged for sucking the fluid to be dispensed 104, 105, 109, and the volume of the pump chamber 202 is reduced for dispensing the fluid to be dispensed 104, 105, 109.

For performing a suction stroke of the micropump 101, the membrane 202 is raised by the deflection means 221, i.e. deflected towards the top and in the direction of the end portions 240, 241 of the micropump, respectively.

For performing a pressure stroke of the micropump 101, the membrane 222 is lowered by the membrane deflection means 221, i.e. deflected towards the bottom and in the direction of the flow sensors 106, 110, respectively.

The membrane deflection means 221 is advantageously a piezoelement that is configured to deflect the membrane 222 in dependence on the voltage applied to the piezoelement 221.

The above-described flow sensor 106, 110 is advantageously configured as a semiconductor chip, for example consisting of silicon. In the chip 106, 110, a membrane 220 is formed by conventional etching methods (FIG. 2B). On the membrane 220, for example, four resistances 108 arranged in a Wheatstone bride circuit are arranged, wherein two resistances 108 each can be detected in the sectional views shown in the figures. The Wheatstone bridge circuit serves as flow rate measuring means 108. The opening 107, 111 provided in the flow sensor 106, 110 is advantageously configured in the membrane 220 and serves as forward resistance with defined flow resistance. The opening 107, 111 can be introduced into the membrane 220, for example by means of dry etching.

The pump used in the inventive microdosing system 100, 300 is a micropump 101 with small dimensions. The lateral dimension of the pressure sensor membrane 220, for example, is advantageously in a range of 2×2 mm² to 5×5 mm². The membrane thickness is advantageously in a range between 20 µm and 60 µm. The diameter of the opening can, for example, be in a range between 10 µm and 100 µm. Additionally, a plurality of openings 107, 111 can be provided in the membrane 220.

The flow sensors 106, 110 are configured to determine, by means of the flow rate measuring means 108, 112, the amount of fluid flowing through the opening 107, 111 based on a transient, i.e. time-dependent pressure signal. Here, the flow sensor 106, 110 measures the pressure difference between the side of the membrane 220 of the flow sensor 106 facing the pump inlet 110 and the pump outlet 103, respectively, and the side of the membrane 220 facing away from the pump inlet 102 and the pump outlet 103, respectively.

The pressure difference changes over time. In that way, for example in a flow sensor 106 arranged on the outlet side, at the beginning of a pump stroke on the side of the membrane 220 facing the pump outlet 103, a high initial pressure is applied, which is higher than the pressure applied to the side of the membrane 220 facing away from the pump outlet 103. Thus, the rising edge of the pressure profile on the side of the membrane 220 facing the pump outlet 103 rises steeply at the beginning of the pump stroke.

The further the pump stroke comes to its end, the more fluid has already flowed through the opening 107 formed in the membrane 220. Accordingly, the overpressure on the side of the membrane 220 facing the pump outlet 103 is reduced further and further compared to the overpressure on the side of the membrane 220 facing away from the pump outlet 103. Thus, the pressure profile and pressure signal, respectively, has a falling edge over time.

Here, the flow sensor 106, 110 is configured such that the time-dependent fluid flow through the opening 107, 111 can be determined from the measured time-dependent pressure signal and the statistic characteristic curve of the opening 107, 111. This fluid flow can be integrated over time in order to determine the dosed volume and the flow rate, respectively.

Thus, based on the pressure, the flow sensor 106, 110 determines, by means of the flow rate measuring means 108, 112, the flow rate of the fluid to be dispensed flowing through the opening 107, 111 of the flow sensor 106, 110.

In order to ensure that no fluid flows through the micropump 101, even in the switched off state of the micropump 101, the following has to be considered. On the one hand, "free flow" may not occur, in that it is ensured that no inlet pressure occurs. This can be realized in that the reservoir 201 including the fluid is arranged below the micropump 101 as shown in FIGS. 2A and 2B. Further, no overpressure should be applied to the reservoir 201. In the inventive microdosing system 100, 300, generally, low pressures should occur in order to use the same, for example, in dosing patches.

Additionally, no flow should occur through closed valves 310, 311. If the pressure on the outlet side is higher than the pressure on the inlet side, these valves 310, 311 close. If the pressure on the inlet side is higher than the pressure on the outlet side, these valves 310, 311 open and the so-called free flow can occur. For preventing this, additional valves 140a, 140b (FIG. 1B) can be provided. These valves 140a, 140b can be configured, for example, as one of the following valves:
    Active valves
        NO valve, which is closed
        NC valve
    Passive valves
        Safety valve
        DNC Valve
        Microvalve with operation threshold pressure Further, according to embodiments of the invention, no fluidic capacitances e.g., soft plastic tubes or other elastic elements) that cause time delays until the flow comes to a standstill exist between the micropump 101 and the flow sensors 106, 110. This means, advantageously, no long soft lines exist between the micropump 101 and the flow sensors 106, 110.

An advantageous arrangement would be, for example, a micropump 101 with a safety valve where the flow sensor 106, 110 is arranged immediately prior to or after the micropump 101, e.g. by adhesing, clamping (via a seal), soldering the flow sensor directly onto the bottom of the micropump at the outlet and inlet, respectively.

A great advantage of the inventive microdosing system 100, 300 is the fact that the measurement of the flow is very fast, pressure variations and hence flow variations up to under a millisecond can be resolved. This has already been verified by measurement technology (Proceeding MEMS 99, Orlando/USA, 17-21 Jan. 1999, pp. 118-123).

Fault Detection, Pump Diagnosis Valves, Etc.

This is particularly advantageous since the variations of the pump chamber pressure and also the variations of the flow into and out of the pump chamber happen really fast. Due to the very fast flow sensor 106, 110, not only faults can be detected but the normal pump function can be continuously monitored.

Figure 5:
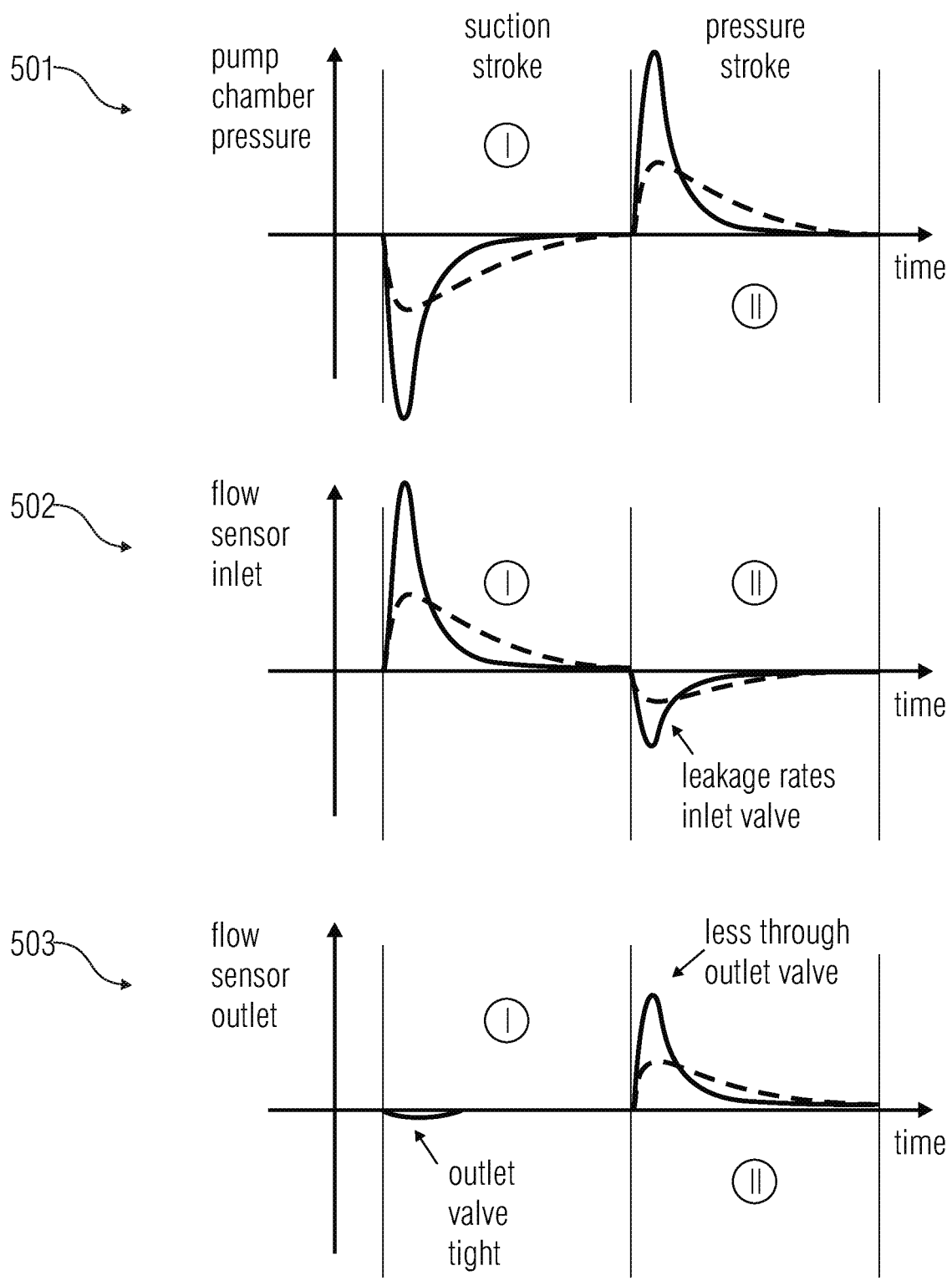
FIG. 5 is a diagram plotting the pump chamber pressure variable over time.

FIG. 5 shows a first diagram 501 where the pump chamber pressure (y axis) is plotted over time (x axis), a second diagram 502 where the flow at the flow sensor 106b, 110 arranged on the inlet side is plotted over time and a third diagram 503 where the flow at the flow sensor 106a arranged on the outlet side is plotted over time. In a first time portion I, the pump 101 is in a suction stroke. In a second time portion II, the pump 101 is in a pump stroke and pressure stroke, respectively.

FIG. 5 shows exemplarily the time-dependent pump chamber pressure course 501 and the flows 502, 503 through the pump valves 310, 311 and hence the flow sensors 106a, 106b, 110 for different states. These states show a micropump 101 including no gas bubble (solid line) and a micropump 111 comprising one or several gas bubbles (dotted line). At the same time, the time-dependent flows measured by the two flow sensors 106, 110 are shown.

Here, the situation is shown when a voltage signal is applied to the piezoelement 108, 112 where the voltage builds up and is reduced very quickly. If, for example, the electric capacitance of the piezoceramic $C_{piezo}$=10 nF and the charging resistance (or the internal resistance of a battery) 1 kOhm, the electric voltage builds up or is reduced with a time constant i=R*C=1 kOhm*10 nF=10 microseconds.

$$\tau_{el}=R_{el}C_{piezo}$$

Further, pressure signals can propagate very fast. This takes place at sound velocity of approximately 300 m/s in air or 1,000 m/s in liquids or solids. With a typical thickness and length of the micropump of 1 to 10 mm, the pressure signal has propagated anywhere in the micropump 101 within several microseconds.

Thus, the pressure signal has a similar speed as the electric signal, at any rate, the same is much faster than the fluidic equalization processes.

Thus, these times are very fast compared to the fluidic times in the millisecond range. Thus, the negative pressure in the suction stroke and the overpressure in the pressure stroke build up very fast. During this short time, no significant equalization flow can flow through the microvalves 310, 311. This explains the great pressure amplitude in the pump chamber immediately after switching on and off the voltage.

By the pressure signals, the respective valves 310, 311 are reverse-biased, the valve flaps open and the fluid can flow in and out of the pump chamber, respectively. This equalization process can also be approximately described by a time constant, wherein the fluidic flow resistances $R_{11}$ of the microvalves 310, 311 (in the suction stroke essentially the resistance of the inlet valve 311, in the pressure stroke the resistance of the outlet valve 310 when no leakage rates exist) and the pump chamber $R_{PK}$ and the fluidic capacitances of the driving membrane $C_M$ and a potential gas bubble in the pump chamber $C_{gas}$ become effective:

$$\tau_{fl} = (R_{fl} + R_{PK})(C_M + C_{gas})$$

The presence of a gas bubble in the pump chamber represents a disturbance whose effect is a fluidic capacitance having a greater or lesser extent (depending on the size of the gas bubble). This has two consequences for the transient signals: the amplitude is reduced and the equalization process for the respective pump stroke is prolonged. This effect depends on the size of the fluidic capacitance and hence on the size of the gas bubble. Thereby, the flow sensors 106, 110 can not only detect the presence of a gas bubble, the size of the gas bubble can also be quantified.

As long as the pressure amplitudes, when a gas bubble exists, are large enough such that the microvalves 310, 311 can be opened, the entire stroke can still be performed, it only takes slightly longer. However, when the operating frequency f=1/T of the micropump 101 becomes large enough, it is obvious that that the delays by the gas bubble may have the effect that the pump stroke can no longer be performed completely when the available time for suction and pressure stroke becomes less than the necessitated equalization processes.

This would mean that the delivery volume per pump cycle at this higher operating frequency is greater without the gas bubble than with the gas bubble. Thus, at high operating frequencies, the gas bubble changes the delivery amount per pump cycle and hence the pump rate. However, both can be detected exactly by the flow sensors 106, 110. The microdosing system 100 can not only measure the reduction of the delivery amount but also determine its cause, namely, the entry of a gas bubble into the pump chamber.

In FIG. 5, the case is shown exemplarily where the inlet valve 311 is leaking and during the pressure stroke only approximately 60% is delivered in the correct direction per time unit but 40% flows back through the leaking inlet valve 311.

The advantage of the transient analysis can also be seen from the following example: when the micropump 101 is inactive and/or when the microvalves 310, 311 are closed, no flow should flow through the microdosing system 100. When the flow sensor 106, 110 shows a difference value compared to the last calibration, this can have two causes: first, the sensor 106, 110 can have drifted in the meantime or a leakage rate can have formed in the microvalve 310, 311 (e.g. by particles). These possible causes cannot be differentiated by the flow sensor 106, 110 when the micropump 111 is inactive. If the above-described transient measurement determines a leakage flow (e.g., the flow sensor 110 arranged on the inlet side during the pressure stroke for the inlet valve 311 and the flow sensor 106 arranged on the outlet side during the suction stroke for the outlet valve 310) the above causes can be clearly differentiated: drifting of the sensor 106, 110 is performed on a long time scale, a respective sensor pulse on the millisecond time scale can thus be allocated to a leakage.

Also, a diagnosis routine can determine when one of the valves 140a, 140b (NC, NO, DNC . . . ) within the series has leakage rates (e.g., due to particles). In this case, the pump 101 is operated with the closed valve 140a, 140b. When the valve 140a, 140b is tight, no flow may flow through the respective flow sensor 106, 110 during the respective pump stroke (depending on whether the valve 140a, 140b is in the suction line or the pressure line). If the flow sensor 106, 110 still determines a transient signal, a leakage of this valve 140a, 140b can be clearly determined.

Figure 4:
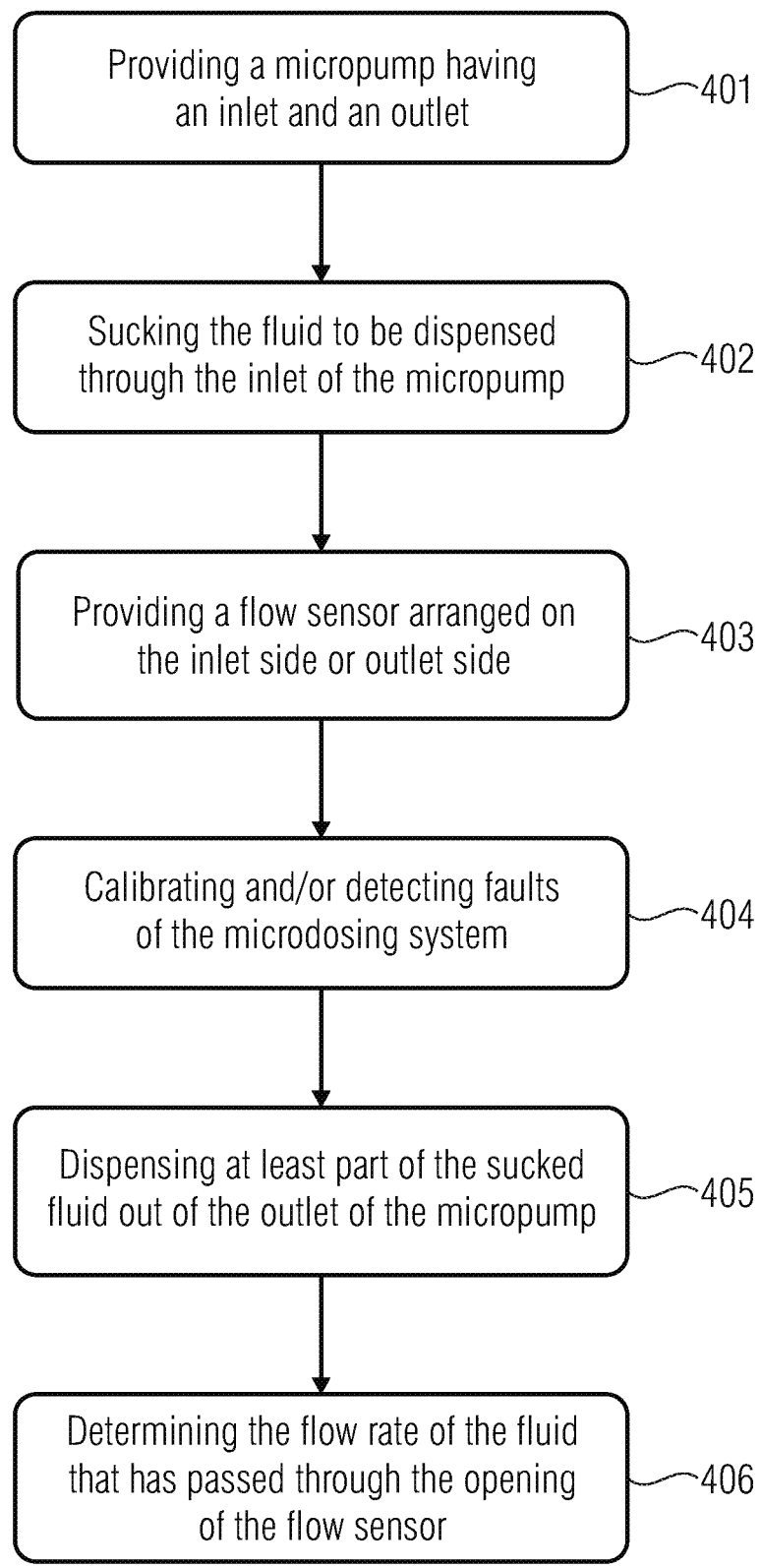
FIG. 4 is a block diagram of an inventive method.

FIG. 4 shows a block diagram of an inventive method for dosing an amount of fluid to be dispensed by means of a microdosing system 100. According to the invention, the individual method steps and in particular the shown method step 404 for calibrating and/or detecting faults of the microdosing system 100 can be also performed in an order differing from the illustrated order.

In step 401, a micropump 101 comprising an inlet 102 and an outlet 103 is provided.

In step 402, the fluid to be dispensed 104, 105, 109 is sucked through the inlet 102 of the micropump 101.

In step 403, a first flow sensor 106a, 106b arranged on the inlet side or on the outlet side is provided, whereby the flow sensor 106a, 106b comprises an opening 107a, 107b and a flow rate measuring means 108a, 108b.

In step 404, the microdosing system 101, 301 is calibrated and/or faults are detected.

In step 405, at least part of the sucked fluid 104, 105, 109 is dispensed from the outlet 103 of the micropump 101.

In step 406, the flow rate of the fluid passing through the opening 107a, 107b of the flow sensor 106a, 106b is determined.

As an overview, some advantages of the inventive microdosing system 100, 300 described above with reference to the figures are listed below:

The two flow sensors 106, 110 monitor each other

Prior to the suction stroke: both flow sensors 106, 100 are "set to zero"

Suction stroke:
   Filling the pump chamber 202 through the valve 311 on the inlet side is measured by the flow sensor 110 arranged on the inlet side
   At the same time, the flow sensor 106 arranged on the outlet side measures possible leakage rates of the valve 310 on the outlet side by means of the flow rate measuring means 108
   By integrating the flow sensor signal of both flow sensors 106, 110, the stroke volume can be determined exactly.

After the suction stroke: the flow sensor 106, 110 is set to zero again

Pressure stroke:
   Discharging the stroke volume through the valve 310 on the outlet side is measured by the flow sensor 106 on the outlet side
   At the same time, the flow sensor 110 arranged on the inlet side measured the possible leakage rates of the valve 311 on the inlet side by means of the flow rate measuring means 112
   By integrating the flow sensor signal of both flow sensors 106, 110 the stroke volume can again be determined exactly Possible volume stroke differences for suction stroke measurement still show the measurement error After the pressure stroke: voltage sensors 106, 110 are set to zero again.

Advantageously, not only the pump rate can be measured, but the function of the pump drive and of both valves 310, 311 including leaking rates can be permanently monitored.

A further advantage of the inventive microdosing system 100, 300 is the option of detecting a orifice plate blockage, i.e. a blockage of the respective opening 107, 111 of a flow sensor 106, 110. Such a detection of an orifice plate blockage can be performed by transient signal analysis.

With a static flow, the flow sensor 106, 110 cannot differentiate whether the orifice plate and the opening 107, 111, respectively, is blocked. However, the transient time-dependent signal at an opening 107, 111 of a flow sensor 106, 110 differs, depending on whether the opening 107, 111 is blocked or not.

When the opening 107, 111 is not blocked, the pressure pulse generated by the micropump 101 will be reduced again within several milliseconds. If the opening 107, 111 is blocked, an overpressure will build up that cannot flow off. This can be detected by a signal analysis of the respective flow sensor 106, 110.

Although some aspects have been described in the context of an apparatus, it is obvious that these aspects also represent a description of the corresponding method, such that a block or device of an apparatus also corresponds to a respective method step or a feature of a method step. Analogously, aspects described in the context of a method step also represent a description of a corresponding block or detail or feature of a corresponding apparatus. Some or all of the method steps may be executed by (or using) a hardware apparatus, like, for example, a time-resolved sample & hold data acquisition, a microprocessor, a programmable computer or an electronic circuit. In some embodiments, some or several of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which are capable of cooperating or cooperate with a programmable computer system such that the respective method is performed. Therefore, the digital storage medium may be computer readable.

Some embodiments according to the invention include a data carrier comprising electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer.

The program code may, for example, be stored on a machine readable carrier.

Time-resolved data acquisition of the flow sensors, data processing, control of the micropump, generation of the high voltage necessitated for the micropump that is, e.g. piezo- or electrostatically driven, and the control and regulation algorithms can be mounted, for example, on an ASIC (application specific integrated circuit), whereby the entire microdosing system micropump, flow sensors, control and ASIC can be realized in a very small installation space (e.g. $10 \times 10 \times 2$ mm$^3$).

Other embodiments comprise the computer program for performing one of the methods described herein, wherein the computer program is stored on a machine readable carrier. In other words, an embodiment of the inventive method is, therefore, a computer program comprising a program code for performing one of the methods described herein, when the computer program runs on a computer.

A further embodiment of the inventive method is, therefore, a data carrier (or a digital storage medium or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transmit a computer program for performing one of the methods described herein to a receiver. The transmission can be performed electronically or optically. The receiver may, for example, be a computer, a mobile device, a memory device or the like. The apparatus or system may, for example, comprise a file server for transferring the computer program to the receiver.

In some embodiments, a programmable logic device (for example a field programmable gate array, FPGA) may be used to perform some or all of the functionalities of the methods described herein. In some embodiments, a field programmable gate array may cooperate with a microprocessor in order to perform one of the methods described herein. Generally, the methods are performed by any hardware apparatus. This can be a universally applicable hardware, such as a computer processor (CPU) or hardware specific for the method, such as ASIC.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Microdosing system for dosing an amount of fluid to be dispensed, comprising:
    a micropump comprising a membrane, an inlet and an outlet and configured to suck the fluid to be dispensed through the inlet and to dispense at least part of the fluid from the outlet,
    a first semiconductor chip flow sensor arranged on the inlet side or the outlet side comprising an opening and a flow rate meter, wherein the flow rate meter is configured to determine the flow rate of the fluid passing through this opening, and a calibrator and fault detector for calibration and fault detection of the microdosing system;

wherein the calibrator and fault detector of the microdosing system comprises a controller that is configured to detect an actual sensor signal of the first flow sensor when the micropump is inactive and to correct subsequent sensor signals of the first flow sensor based thereon in order to counteract a sensor drift of the first flow sensor and to calibrate the microdosing system.

2. Microdosing system according to claim 1, wherein the controller is configured to subtract a correction value, prior to performing a measurement of the first flow sensor, from the amount of a previously detected actual sensor signal, or to store the amount of the previously detected actual sensor signal as a correction value at first and to subtract the same only after performing a subsequent measurement of the first flow sensor from the amount of the sensor signal measured thereby, in order to subtract the stored correction value as an offset from the acquired measurement value only after the measurement has been performed.

3. Microdosing system according to claim 1, wherein the controller is configured to determine a correction value and to subtract the same from the amount of the detected actual sensor signal of the first flow sensor, wherein the acquired difference value forms a corrected starting point for subsequent sensor signals of the first flow sensor.

4. Microdosing system according to claim 3, wherein the amount of the correction value corresponds to the amount of the detected actual sensor signal of the first flow sensor, or wherein the amount of the correction value is within a range of the amount of the detected actual sensor signal plus a tolerance value in the amount of ±10% of the measured sensor signal or plus a tolerance value in the amount of ±20% of the measured sensor signal.

5. Microdosing system according to claim 1, wherein the controller is configured to perform detection of the actual sensor signal of the first flow sensor and correction of subsequent sensor signals prior to any pump stroke or prior to each pump stroke.

6. Microdosing system according to claim 1, wherein the microdosing system comprises units that are configured to provide, on the inlet side, the same pressure as on the outlet side or a lower pressure than on the outlet side in order to prevent free flow of the fluid to be dispensed through the micropump.

7. Microdosing system according to claim 1, wherein the microdosing system comprises a valve arranged on the inlet side and/or the outlet side, wherein the valve is an active normally closed valve and/or an active normally open valve and/or a valve with operation threshold pressure closed below a threshold pressure and/or a double normally closed microvalve and/or a safety valve.

8. Microdosing system according to claim 1, wherein the flow rate meter is configured as a differential pressure sensor that is configured to measure the pressure applied in front of the opening as well as the pressure applied behind the opening and to determine the differential pressure, and wherein the controller is configured to determine, by means of integrating the flow rate Q of the fluid according to the formula $$V = \int_{t_1}^{t_2} Q \, dt,$$

the fluid volume V of the fluid that has flowed through the flow rate meter.

9. Microdosing system according to claim 8, wherein the controller is configured to determine a stroke volume of the micropump in the suction stroke by integrating the flow rate determined by means of the differential pressure sensor arranged on the inlet side, and to determine the stroke volume of the micropump in the pressure stroke by integrating the flow rate determined by means of the differential pressure sensor arranged on the outlet side.

10. Microdosing system according to claim 1, wherein the controller is configured to compare stroke volumes determined in the suction stroke and in the pressure stroke and to determine volume stroke differences for detecting a fault of the micropump.

11. Microdosing system according to claim 1, wherein the microdosing system comprises a second flow sensor comprising an opening and a flow rate meter, wherein the flow rate meter is configured to determine the flow rate of the fluid passing through this opening, wherein the second flow sensor is arranged on the inlet side and the first flow sensor on the outlet side.

12. Microdosing system according to claim 11, wherein the controller is configured to control the micropump as well as the first flow sensor arranged on the outlet side and the second flow sensor arranged on the inlet side, such that both the first and the second flow sensor determine the flow rate of the fluid flowing through the respective opening of the first and second flow sensor when the micropump sucks the fluid to be dispensed, and wherein the controller is further configured to compare the flow rate determined by the first flow sensor and the flow rate determined by the second flow sensor, such that the calibrator and/or fault detector can detect a leakage flow on the outlet side at the valve on the outlet side in the suction stroke of the micropump.

13. Microdosing system according to claim 11, wherein the controller is configured to control the micropump as well as the first flow sensor arranged on the first outlet side and the second flow sensor arranged on the inlet side, such that the first and second flow sensor determine the flow rate of the fluid flowing through the respective opening of the first and second flow sensor when the micropump dispenses the fluid to be dispensed from the outlet, and wherein the controller is further configured to compare the flow rate determined by the first flow sensor and the flow rate determined by the second flow sensor, such that the calibrator and/or fault detector can detect a leakage flow on the inlet side at the valve on the inlet side in the pressure stroke of the micropump.

14. Microdosing system according to claim 1, wherein the micropump comprises a pump chamber arranged between the inlet and the outlet, the membrane being arranged at least in sections in the region of the pump chamber and a membrane deflector, wherein the membrane deflector is configured to deflect the membrane such that the volume of the pump chamber is increased for sucking the fluid to be dispensed and the volume of the pump chamber is reduced for dispensing the fluid to be dispensed.

15. Microdosing system according to claim 14, wherein the membrane deflector is a piezoelement that is configured to deflect the membrane in dependence on the voltage applied to the piezoelement.

16. Microdosing system according to claim 1, wherein the controller is configured to compare the flow rate determined by means of the first flow sensor to a predetermined flow rate comparison value and to control the micropump for so long until the flow rate determined by means of the first flow sensor is equal to or greater than the predetermined flow rate comparison value.

17. Microdosing system according to claim 1, wherein fluid connectors are arranged between the micropump and the first and/or second flow sensor, which fluid connectors comprise a volume that remains constant with varying operating pressure of the micropump.

18. Microdosing system according to claim 1, wherein, in a flow direction, the flow sensor is arranged immediately in front of or behind the micropump and directly on a bottom side of the micropump at the outlet or inlet, respectively.

19. Method for dosing an amount of fluid to be dispensed by means of a microdosing system, comprising:
providing a micropump comprising an inlet and an outlet,
sucking the fluid to be dispensed through the inlet of the micropump,
providing a first flow sensor arranged on the inlet side or outlet side comprising an opening and a flow rate meter,
dispensing at least part of the sucked fluid from the outlet of the micropump, and
determining the flow rate of the fluid that has passed through the opening of the flow sensor, and
providing a calibrator and fault detector for calibrating and detecting faults of the microdosing system,
wherein the calibrator and fault detector of the microdosing system comprises a controller that is configured to detect an actual sensor signal of the first flow sensor when the micropump is inactive and to correct subsequent sensor signals of the first flow sensor based thereon in order to counteract a sensor drift of the first flow sensor and to calibrate the microdosing system.

20. Method according to claim 19, wherein calibrating and detecting faults of the microdosing system comprises:
detecting an actual sensor signal of the first flow sensor when the micropump is inactive, and
correcting subsequent sensor signals of the first flow sensor based on the detected actual sensor signal.

21. Method according to claim 19, wherein calibrating and detecting faults of the microdosing system comprises:
determining a correction value and subtracting the correction value from the amount of the detected actual sensor signal of the first flow sensor to acquire a difference value, and
using the acquired difference value as corrected starting point for subsequent sensor signals of the first flow sensor.

22. Method according to claim 21, wherein determining the correction value comprises:
determining a correction value whose amount corresponds to the amount of the detected actual sensor signal of the first flow sensor, or determining a correction value whose amount is within a range of the amount of the detected actual sensor signal of the first flow sensor plus a tolerance value in the amount of ±10% of the detected actual sensor signal of the first flow sensor or a tolerance value in the amount of ±20% of the detected actual sensor signal of the first flow sensor.

23. Method according to claim 19, further comprising ensuring that no free flow of the fluid to be dispensed takes place from the inlet to the outlet when the micropump is inactive.

24. Method according to claim 23, comprising providing a valve arranged on the inlet side and/or outlet side, wherein the valve is an active normally closed valve and/or an active normally open valve and/or a valve with operation threshold pressure closed below a threshold pressure and/or a double normally closed microvalve and/or a safety valve.

25. Method according to claim 19, comprising providing a pressure on the inlet side and a pressure on the outlet side, wherein the pressure on the inlet side is the same as or less than the pressure on the outlet side.

26. Method according to claim 19, the method further comprising providing a second flow sensor, wherein the first flow sensor is arranged on the outlet side and the second flow sensor on the inlet side.

27. Method according to claim 19, further comprising:
sucking the fluid to be dispensed through the inlet,
measuring the flow rate of the fluid flowing through the opening of a second flow sensor arranged on the inlet side and measuring the flow rate of the fluid flowing through the opening of the first flow sensor arranged on the outlet side, and
comparing the two measured flow rates.

28. Method according to claim 19, further comprising:
dispensing the fluid to be dispensed through the outlet,
measuring the flow rate of the fluid flowing through the opening of a second flow sensor arranged on the inlet side and measuring the flow rate of the fluid flowing through the opening of the first flow sensor arranged on the outlet side, and
comparing the two measured flow rates.

29. Method according to claim 27, further comprising:
sucking the fluid to be dispensed through the inlet and measuring the flow rate of the fluid flowing through the opening of the second flow sensor arranged on the inlet side,
dispensing the fluid to be dispensed through the outlet and measuring the flow rate of the fluid flowing through the opening of the first flow sensor arranged on the outlet side, and
comparing the two measured flow rates.

* * * * *